(12) United States Patent
Bustamante et al.

(10) Patent No.: US 11,620,004 B2
(45) Date of Patent: *Apr. 4, 2023

(54) COMPUTER MOUSE WITH ENHANCED FUNCTIONALITY

(71) Applicant: BT5 Technologies, LLC, Katy, TX (US)

(72) Inventors: Luis Bustamante, The Woodlands, TX (US); Camila Bustamante, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,280

(22) Filed: Aug. 27, 2020

(65) Prior Publication Data

US 2021/0064154 A1 Mar. 4, 2021

Related U.S. Application Data

(60) Provisional application No. 62/892,553, filed on Aug. 28, 2019.

(51) Int. Cl.
*G06F 3/0354* (2013.01)
*G06F 3/038* (2013.01)
(Continued)

(52) U.S. Cl.
CPC .......... *G06F 3/03543* (2013.01); *G06F 3/038* (2013.01); *G16Y 10/75* (2020.01); *H04L 67/125* (2013.01)

(58) Field of Classification Search
CPC ...... G06F 3/03543; G06F 3/038; G16Y 10/75
See application file for complete search history.

(56) References Cited

U.S. PATENT DOCUMENTS

| 4,917,516 A | 4/1990 | Retter |
| 6,025,831 A | 2/2000 | Gardiner |

(Continued)

FOREIGN PATENT DOCUMENTS

| CN | 2765249 Y | 12/2004 |
| CN | 101976125 A | 9/2010 |

(Continued)

OTHER PUBLICATIONS

3DConnexion Spacemouse Enterprise, Advertisement, BH#3DX700056, Sep. 13, 2019.

(Continued)

*Primary Examiner* — Ariel A Balaoing
(74) *Attorney, Agent, or Firm* — Joseph P. Aiena

(57) ABSTRACT

There is provided a computer mouse, in an unibody or modular form, which incorporates IoT capabilities and the flexibility to install and interchange different types of functional apparatuses and accessories, such as a monitor, microphone, sensors, and characters/figurines. This multiple application computer mouse interacts mechanically, electronically, visually and/or orally with the user or third parties. Internal and external structures house additional and/or extended electronic boards and connectors which manage, interface and/or detect the signals obtained from the functional apparatuses and/or characters installed in the hub section of this computer mouse, and receive and/or send signals to an external device, such as a computer, monitor, sensors or other devices or software installed in apparatuses of the internet cloud.

19 Claims, 34 Drawing Sheets

(51) Int. Cl.
*H04L 67/125* (2022.01)
*G16Y 10/75* (2020.01)

(56) References Cited

U.S. PATENT DOCUMENTS

| | | | |
|---|---|---|---|
| 6,392,671 | B1 | 5/2002 | Glaser |
| 6,433,779 | B1 | 6/2002 | Woolman |
| 6,590,563 | B1* | 7/2003 | Gross ................. G06F 3/039 |
| | | | 345/163 |
| 6,720,950 | B2 | 4/2004 | Cheng |
| 6,909,421 | B2 | 6/2005 | Wang |
| 7,081,033 | B1* | 7/2006 | Mawle ................. A63F 13/23 |
| | | | 446/298 |
| 7,233,319 | B2 | 6/2007 | Johnson et al. |
| 7,737,946 | B2 | 6/2010 | Yen |
| 7,800,584 | B2 | 9/2010 | Chang |
| 9,927,890 | B1 | 3/2018 | Perlman |
| 10,286,328 | B2* | 5/2019 | Adamenko ........... A63H 17/00 |
| 2002/0117549 | A1 | 8/2002 | Lee |
| 2003/0071790 | A1 | 4/2003 | Cheng |
| 2004/0201574 | A1 | 10/2004 | Wei |
| 2005/0219208 | A1* | 10/2005 | Eichenberger ...... G06F 3/03543 |
| | | | 345/157 |
| 2006/0007151 | A1 | 1/2006 | Ram |
| 2006/0044274 | A1 | 3/2006 | Numazawa et al. |
| 2006/0097120 | A1 | 5/2006 | Chang |
| 2006/0244726 | A1 | 11/2006 | Wang et al. |
| 2007/0132733 | A1* | 6/2007 | Ram .................. G06F 3/03544 |
| | | | 345/163 |
| 2008/0246727 | A1* | 10/2008 | Larsen ............... G06F 3/03543 |
| | | | 345/163 |
| 2008/0316173 | A1* | 12/2008 | Tsai .................. G06F 3/03543 |
| | | | 345/163 |
| 2010/0231514 | A1 | 9/2010 | Liang et al. |
| 2011/0063219 | A1* | 3/2011 | Min-Liang ......... G06F 3/03543 |
| | | | 345/163 |
| 2011/0193780 | A1 | 8/2011 | Schaaf |
| 2013/0154932 | A1* | 6/2013 | Liu .................... G06F 3/03543 |
| | | | 345/163 |
| 2013/0169538 | A1 | 7/2013 | Wu |
| 2014/0162785 | A1* | 6/2014 | Reiche ................. A63F 13/49 |
| | | | 463/36 |
| 2014/0254075 | A1 | 9/2014 | Schaaf |
| 2016/0166925 | A1* | 6/2016 | Ampleman .......... A63F 13/235 |
| | | | 463/29 |
| 2016/0236085 | A1* | 8/2016 | Yano ................... A63F 13/235 |
| 2021/0303052 | A1* | 9/2021 | Correia Xavier ....... G06F 1/266 |

FOREIGN PATENT DOCUMENTS

| | | |
|---|---|---|
| CN | 201853240 U | 6/2011 |
| CN | 107329595 A | 11/2017 |
| CN | 108519830 A | 9/2018 |
| CN | 110096100 A | 8/2019 |
| GB | 2417107 A | 2/2006 |
| KR | 200187263 | 7/2000 |
| KR | 100481754 | 3/2005 |
| KR | 100815110 B1 | 3/2008 |
| TW | M496305 U | 2/2015 |

OTHER PUBLICATIONS

Amiibo By Nintendo, Game, Nintendo 3DS, Game Store, Nintendo Website, Sep. 13, 2019.
Mouse Pad Has Mic, Speakers and USB Hub By Ben Rogerson, Tech, Aug. 18, 2008, Music Radar Website, Sep. 13, 2019.
Raspberry Pi Computer By John Martindale, Jan. 14, 2019, Created By You Tuber Electron Grenade, Website www.digitaltrends.com, Sep. 13, 2019.
USB Skype Mouse, Product Code UMOUS002300, usb.brando.com, Website https://usb.brando.com, Sep. 13, 2019.
Written Opinion, PCT US2020/067744, dated May 3, 2021, pp. 5-8 and references cited. (US 2003/0071790A1 Cheng; US 2006007151A1 Ram).

* cited by examiner

COMPUTER MOUSE WITH ENHANCED FUNCTIONALITY

CROSS REFERENCE TO RELATED APPLICATIONS

This application claims the benefit of and priority to U.S. Provisional Patent Application No. 62/892,553 filed on Aug. 28, 2019 and hereby incorporated by reference in its entirety.

FIELD OF THE INVENTION

The present invention relates generally to computer peripheral devices. More particularly, the present invention relates to a computer mouse composed of a main frame and a hub section with functional capabilities for power, audio, video and data transmission, with IoT (Internet of Things) and mechanical capabilities to attach apparatuses and/or characters in either a unibody or a modular frame.

BACKGROUND

The computer's external mouse has been used for years and has reached a mature product stage. There is a need for a new generation of a computer mouse to provide enhanced functionality for work performance, entertainment, and connectivity with the IoT.

SUMMARY OF THE INVENTION

The present invention provides the computer mouse with new types of uses and IoT capabilities creating a new generation of this apparatus. With the present invention, the computer mouse has extended functionality within the apparatus as a unitary piece design or as a modular frame design with attachments. The mouse of this invention is a new IoT apparatus that can exchange video and data among the cloud, computer and different accessories such as, but not limited to, characters/figurines or touch-screens, and it can be used in different applications such as personal use, entertainment, healthcare, office and home applications.

The mouse of the present invention can be built of a single frame (unibody mouse) or multiple frames (modular mouse) composed of, but not limited to, a main frame and a hub section. The mouse includes different features such as speakers, voice/noise/video download and recording memory, RFID capability for characters, wireless or wired mouse connectivity, built-in memory to save information on the go, IoT connectivity, and the mechanical, data, video, audio, and power supply to connect different peripherals such as, but not limited to, characters, sensors or a touch-screen. In embodiments, the computer mouse of the present invention has one, two or more frames, which house certain functionalities such as internet of things (IoT) capabilities; and one or more mechanical, electric and electronic connectors between the two or more frames. The present invention includes peripheral head functions which have the ability for connection of a monitor, connection of a character or decorative figure; and peripherals to enhance the work or entertainment performance.

The present invention is a computer mouse, known also as a computer peripheral or pointing device, with a hub section for extended Internet of Things (IoT) capabilities. The present invention provides the mouse to store one or more monitors or other accessories attached underneath. There is also provided a mechanical connector to attach characters, sensors, monitors or other devices to the mouse of the present invention. The present invention also provides for a computer mouse with two-way communication feature, acting as an HMI (Human-Machine Interface) including visual and/or noises interaction and signals. The general shape of the present invention falls within the range of a computer mouse that is available in the current market but may be produced slightly larger to accommodate for added internal components that are built into the unibody or modular frames. The overall layout would be asymmetrical or symmetrical along a line that runs from the front to the back of the body of the mouse along the top face. This invention is built for regular use as a pointing device to move the cursor in a desktop or laptop computers, and includes, but is not limited to, two standard click buttons as well as a click wheel situated between the two buttons on the top of the mouse to allow for the common usage of the device. Also, this invention is built for gaming applications and will include additional and programable buttons and software. The front end of the mouse has been extended to allow for the addition of the peripherals described herein. On the hub section, there are sound output holes moulded in the shell to allow for sounds to leave the device as emitted by the speakers. On the top face there are two additional buttons to accommodate the functions of the added devices that become mounted into the hub section. On the top face near the front is a connecting port to allow the mouse to be connected to additional peripherals further detailed herein. At the front of the hub section there are connecting ports, not limited to a USB type C, HDMI, USB type A ports, etc, to allow the mouse to deliver and/or receive power, data and/or video/audio signals from a computer or other similar devices.

The present invention is a computer mouse that incorporates the flexibility to install and interchange different types of apparatuses, such as a monitor, tablets, smartphones, microphone, sensors, etc., and/or characters such as figurines, advertising frames, names, etc. This new utility design of a computer mouse interacts mechanically, visually and/or orally with the user or third parties and be used in different applications.

As mentioned above, the internal and external structures are designed to house an additional and/or extended electronic boards and connectors of the latest technology that manage, interface and/or detect the signals obtained from the apparatuses and/or characters installed on the hub section of this invention, either the unibody mouse or in the modular mouse design, and receive and/or send signals to an external device, such as a computer, tablet, smartphone, toys, or display, etc.

Some of the peripherals that can be installed on the hub section of this invention are, without limiting, the following: 1) Decorative Applications: Fixed or Interchangeable Figurines or Characters, Popular Names, Customized Names, 3D images and similar advertising accessories; 2) Healthcare Applications: Pulse, Oxygen, Temperature, Workstation Light sensors, among others; 3) Office and House Applications: Pointer, Microphone, external Memory, Camera, Lantern, Fingerprint sensors, etc; and, 4) Media Applications: such as a TV Screen, monitor, smartphone, tablet, gaming console, etc.

The unibody mouse design of the present invention is a new computer mouse with enhanced functionality including a main frame integrally connected with a hub section for the unitary device design option, which includes an internal power source and a set of electronics for power, data and/or audio and/or video communication with a computer or other apparatuses. With the present invention, the hub section has, but not limited to, at least one and preferably a pair of input buttons and a port on the top surface that is capable of securing a functional object and electronically transferring power, video, audio and/or data between the functional object and the hub section.

The hub section of the unibody mouse includes a connecting port for power, data and/or video transfer to and from other devices, and at least, but not limited to, one internal speaker, internal memory, USB type C port, and USB type A port, all located into the hub section. Within the hub section, there is a second set of electronics for the internet communication and electronic communication with a computer, and the main frame of this invention. The unibody mouse of this invention can be built with fixed attached accessories, such as figurines or sensors, etc, to the front side or other extended side of the mouse frame, for instance, to the right side of the main frame or the hub section. Also, the accessories such as figurines or sensors, etc. are capable to be disconnected and interchangeable depending on the bases of the accessories and the hub section frame as explained later on herein.

The present invention also includes a modular mouse design with enhanced functionality built of two or more frames. The modular mouse with two frames comprises: 1) the main frame having a first end with an opening for receiving a hub section with at least one connector or connection pin, where the opening is defined by an inner bottom surface, an inner top surface, and a pair of inner sidewalls. At least one of the surfaces, such as the pair of inner side walls, each have a channel slot to receive at least one connector or connection pin from the hub section. The main frame section houses a first set of electronics for internet communication and electronic communication with a computer and the hub section and 2) the hub section of the present invention has at least one, preferably a pair of input buttons, and a mechanical connection on a top surface capable of securing a functional object and electronically transferring power, video, audio and/or data signals among the object, the computer, the hub section and any other connected apparatus to the hub section. A connecting port for power, audio, video and/or data transfer communications to and from the hub section is included, and at least, but not limited to, one internal speaker located on a side surface, internal memory and one or more USB type C port, USB type A input port are included into the hub section. A second set of electronics for internet communication and electronic communication with a computer and the main frame section are located within the hub section. Mating receiver type ports (USB) on the hub section with corresponding male connectors on the main frame section (or vice-versa) also provide connection. Various other methods of connecting the main frame with the hub section of this invention are described further herein and with reference to the Figures.

The unibody and modular design options of the mouse of the present invention described above includes an embodiment where the hub section has the top surface located on a head section. The top surface has at least one or more, preferably two, mechanical connection pins protruding from the top surface for mechanical connection to the objects or accessories.

In an embodiment, the unibody and modular mouse of the present invention includes in addition to the at least two mechanical pins for mechanical attachment of the accessories, a connecting port for power, data and/or video and audio signals that receives a female connector in the object. The object includes items, not limited to, figurines, sensors and media devices. In an embodiment, the hub for a computer mouse device includes a hub section with at least one connector for connecting to a main frame section of a mouse device with the hub section having a connection port on a surface of the hub section and the connection port capable of securing a functional object and electronically transferring power, data, and/or audio, video between the functional object and the hub section. The hub section has an input port for power, data, audio and video transfer communications to and from the hub section and has an internal memory in the hub section. The hub section houses a set of electronics for internet communication and electronic communication with a computer device and the main frame section of the mouse device. The hub for a computer mouse device includes an embodiment where the surface of the hub section is a surface located on a head section of the hub and the surface has at least one mechanical connection protruding from the surface for mechanical connection to the functional object. The functional object includes a female style connector which receives the at least one mechanical connection and the connection port for the data and power transfer. The functional object includes figurines, media devices, or other accessories. An area or section underneath the hub section and on the hub bottom external surface is capable of storing accessories such as a media display screen.

This invention includes also a new universal hub case for a standard computer mouse comprising a mouse seat section for receiving a standard computer mouse, a mouse catch section extending from the mouse seat section with the mouse catch section integrally connected to a hub section having one or more, preferably at least a pair of input buttons and a mechanical connection on a top surface capable of securing a functional object and electronically transferring power, video, audio, and/or data signals between the functional object and the hub section of this invention. The hub section includes various receivers opening(s) for power, data, audio, and/or video transfer communications to and from the hub section and at least one internal speaker located on a side surface of the hub section, an internal memory and one or more USB type C port, USB type A port. The electronics for internet communication and electronic communication with a computer and the computer mouse are included in the hub section. The universal hub case also receives figurines or similar accessories that after installed onto it, are moved with the standard mouse when it is in use.

BRIEF DESCRIPTION OF DRAWINGS

The present invention and embodiments thereof are shown in the figures below and explained with reference to the Figures. In the Figures.

DETAILED DESCRIPTION

Reference will now be made in detail to the preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope thereof. For example, features in one embodiment figure illustrated may be used on another described embodiment figure to yield a further outcome. Therefore, the present invention covers such modifications as it fits within the scope of the appended claims.

Figure 1A:
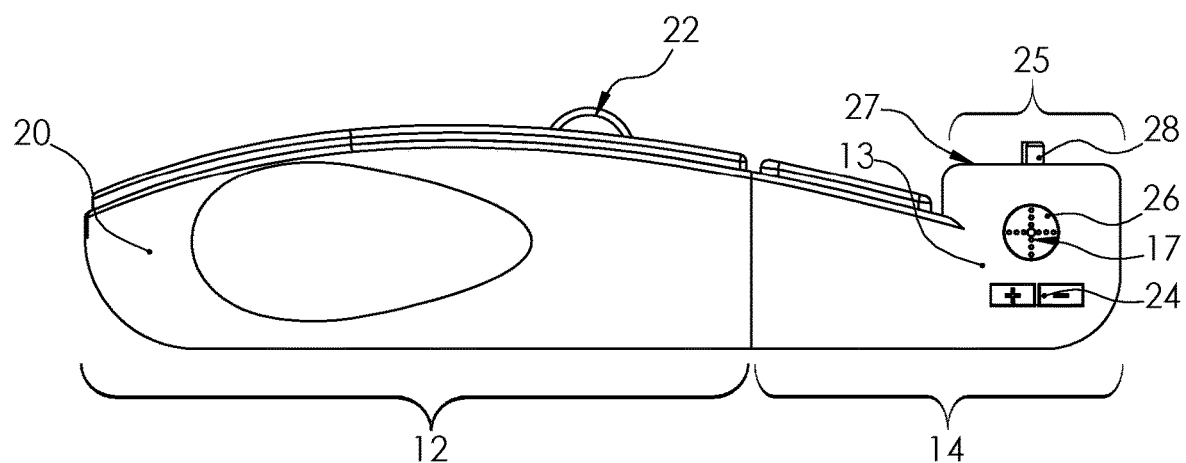
FIG. 1A is a side view and FIG. 1B is a top view illustration of the unibody design embodiment of the present invention.
Figure 1B:
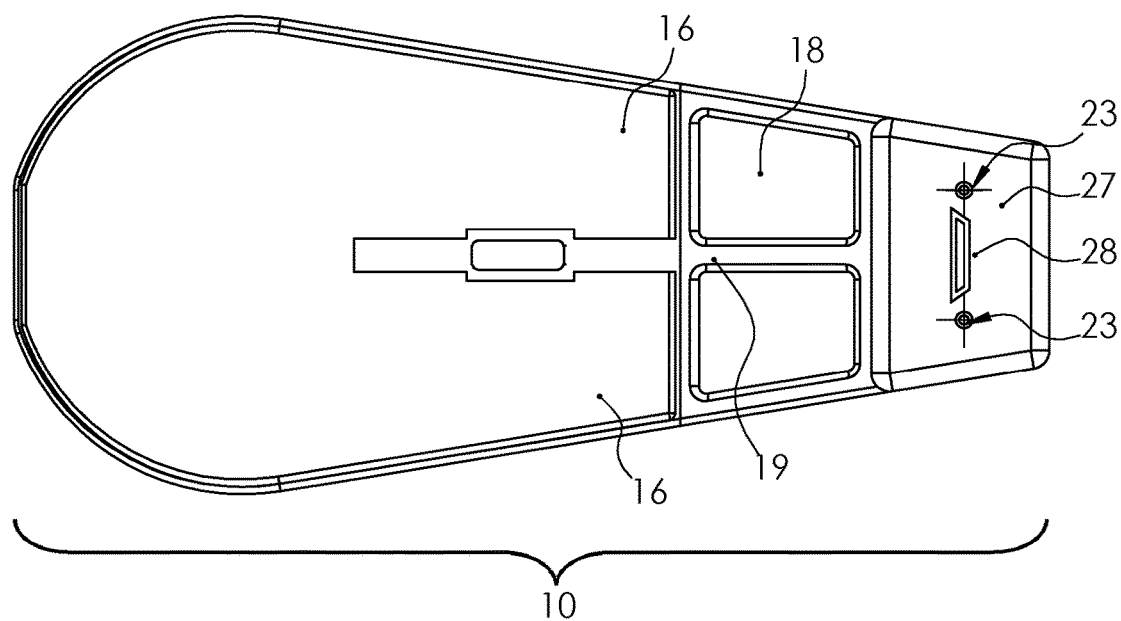

FIG. 1A is a side view and FIG. 1B is the top view, of the unibody mouse 10 of the present invention with a main frame 12 integrally connected to the hub section 14. It is manufactured with an ergonomic continuous body 20 that does not disconnect the hub section 14 from the main frame 12 of this invention. The hub section 14 includes a mechanical connection with connectivity data, audio, video and/or power port 28 on a top surface 27 in a head section area 25 and additional function buttons 18 on a surface 19 which may be below the top surface 27 where the connectivity port 28 is located. The hub section 14 may include internal speakers 26 with openings 17 for sound, and speaker volume control buttons 24 located on the side 13. The common mouse (left and right) buttons 16, and a common mouse wheel 22 are located on the main frame 12 of the present invention. The main frame 12 also houses IoT electronics and any necessary batteries, internal power source or other electronics in the body housing 20 and can be made of suitable materials like plastics and metals. The unibody mouse 10 has a pair of angled sides 13 which approach and narrow towards each other toward the hub section 14.

As mentioned above, the hub section 14 has the top surface 27 located on a head section area 25 where the top surface 27 has at least one, and preferably at least two mechanical pins 23 protruding from the top surface 27 for mechanical connection to an object. This object includes a female connection port which receives at least two mechanical pins 23 and the data, audio, video and/or power connection 28. The mechanical connection and the connecting port 28 are capable of securing a functional object, electronically transferring power, audio, video and/or data between the object (See, FIGS. 3 and 4) and the hub section 14. The port 28 serves as a receiver opening for power, audio, video and/or data transfer communications to and from the hub section 14, and at least one internal speaker located on a side surface 13, that could also house a microphone, videocamera, internal memory and one or more USB type C port, USB type A ports integrated in the hub section 14. The hub section 14 has a second set of electronics for internet communication and electronic communication with a computer, other apparatuses, and/or the main frame section 12.

Figure 2A:
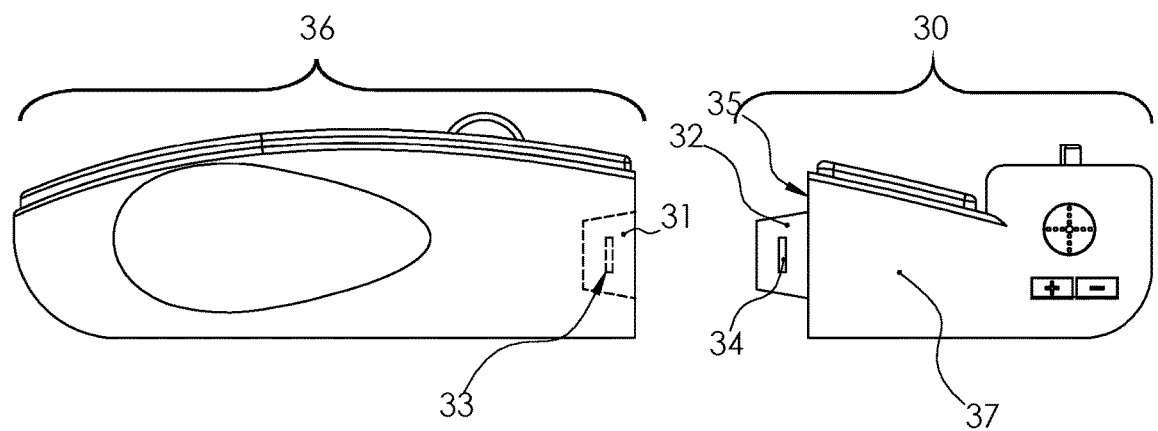
FIG. 2A is a side view.
Figure 2B:
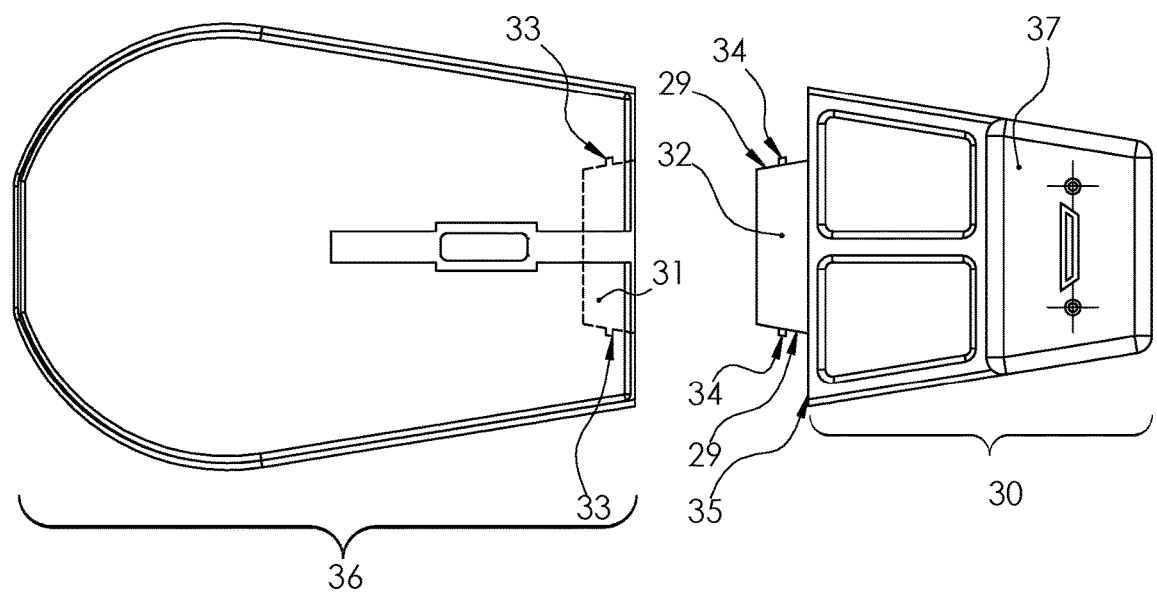
FIG. 2B is a top view.

FIG. 2A is the side view and FIG. 2B is the top view of the two pieces which form the modular design of the mouse of the present invention. It is manufactured with a main frame 36 and a hub section 30. The male mechanical connector 32 located at a first end 35 of the hub section 30 has a connector extrusion 34 that provides mechanical support between the main frame 36 and the hub section 30 when the male mechanical connector 32 enter in the receptor cavity 31 of the main frame 36. FIG. 2B shows the male mechanical connector 32 on the hub section 30 that mates up via press to fit type extrusions 34 located on the lateral sides 29 of the male mechanical connector piece 32. Overall, the male connector 32 mates and fits into the matching inverse receptor cavity 31 inside of the main frame housing 36 with the one or more connector extrusion(s) 34 mating with slots 33 in the receptor cavity 31.

Figure 2C:
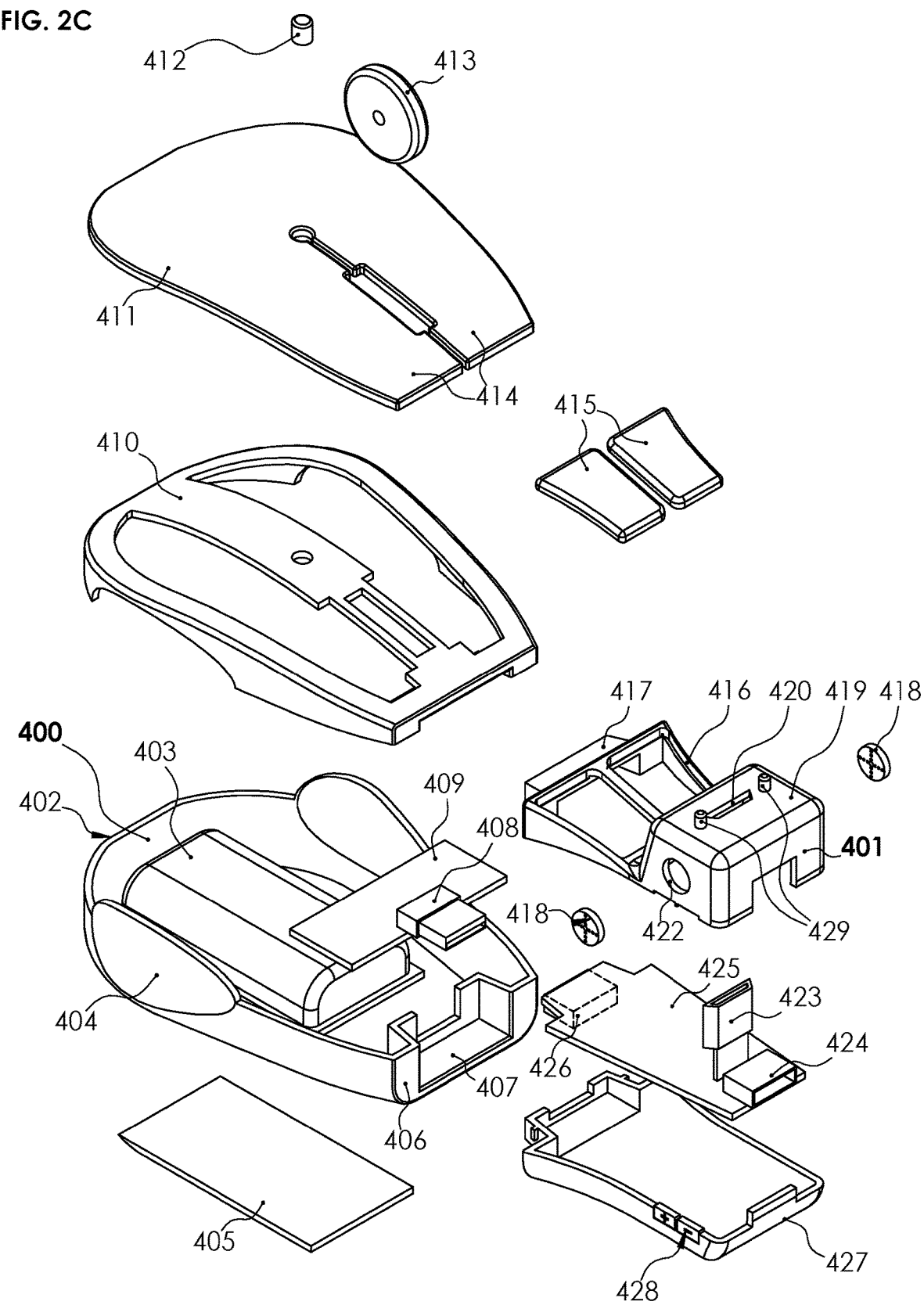
FIG. 2C is an exploded isometric illustration of the modular design embodiment of the present invention in a disconnected position.

Referring now to FIG. 2C, there is shown an exploded view of the modular mouse design of the present invention. The main frame 400 of the modular design comprises, but is not limited to, a lower case 402 in which the compartment for power supply 403 is housed, which can have rechargeable or non-rechargeable batteries (A, AA, etc), its respective battery compartment cover 405, a main frame PCB 409 where the optical, laser of similar type of movement sensor, the push buttons and other electronic components for the mouse functions are located. On the side faces of the lower case 402 of the main frame 400, ergonomic side handles 404 are shown which facilitate the grip of the device and improve its ergonomic comfort. In the frontal area 406 of the lower case 403 of the main frame 400, there is a mechanical connecting cavity 407, which has a connection port 408 that can be USB type A or USB type C or other type of electronic port for transmission of data, power and/or audio and video signals. This connection port 408 is connected to the main frame PCB 409 of the modular mouse of the present invention. The upper case 410 of the main frame 400 closes the device by covering and protecting the electronic components inside. The top cover 411 is an interchangeable piece that can have different printed designs that allows the user to customize the device according to their taste and hobby, in this cover includes the standard (right and left) buttons 414 of the mouse in addition to the indicator light 412 that shows the device's power level and the scroll wheel 413 of the main frame. The hub section 401 is formed by an upper casing 416 on which the hub alternate buttons 415 are located and which has in the front section 419, an opening 420 through which a connection port 423 protrudes. This connecting port 423 can be USB type A, USB type C, HDMI, or any other port that allows the transmission of data, power and/or audio/video signal between the hub section 401 and other devices such as figurines, sensors, monitors, and other accessories, and the one or more pins 429 that mechanically secure these devices to the hub section 401. There are different types of mechanical connecting methods between the objects to this invention, which will be explained later on herein. The hub section input port 424 for power, audio, video and/or data signal transmissions of this invention is shown on the front face of the hub section 401, which can be USB type A or USB Type C, or any other type of connector and/or wireless technology, and is connected to the hub section's PCB 425 which is housed inside the hub section 401. The volume control buttons 428 are located on the right-side face of the lower case 427 of the hub section 401 as well as the openings 422 with their respective grille 418 for the sound output of the internal speakers present on the two side faces of the hub section 401. The hub section 401 is assembled to the main frame 400 by means of an extrusion 417 that is inserted into the cavity 407 of the front face 406 of the main frame 400 of the modular mouse design of the present invention, making a connection between the main frame connection port 408 and the hub connection port 426 for the transfer of data, power, audio and/or video signal between the main frame 400, the hub section 401, and other external connected devices. Other means of connecting the hub section 401 to the main frame 400 are within the scope of the present invention.

Figure 3:
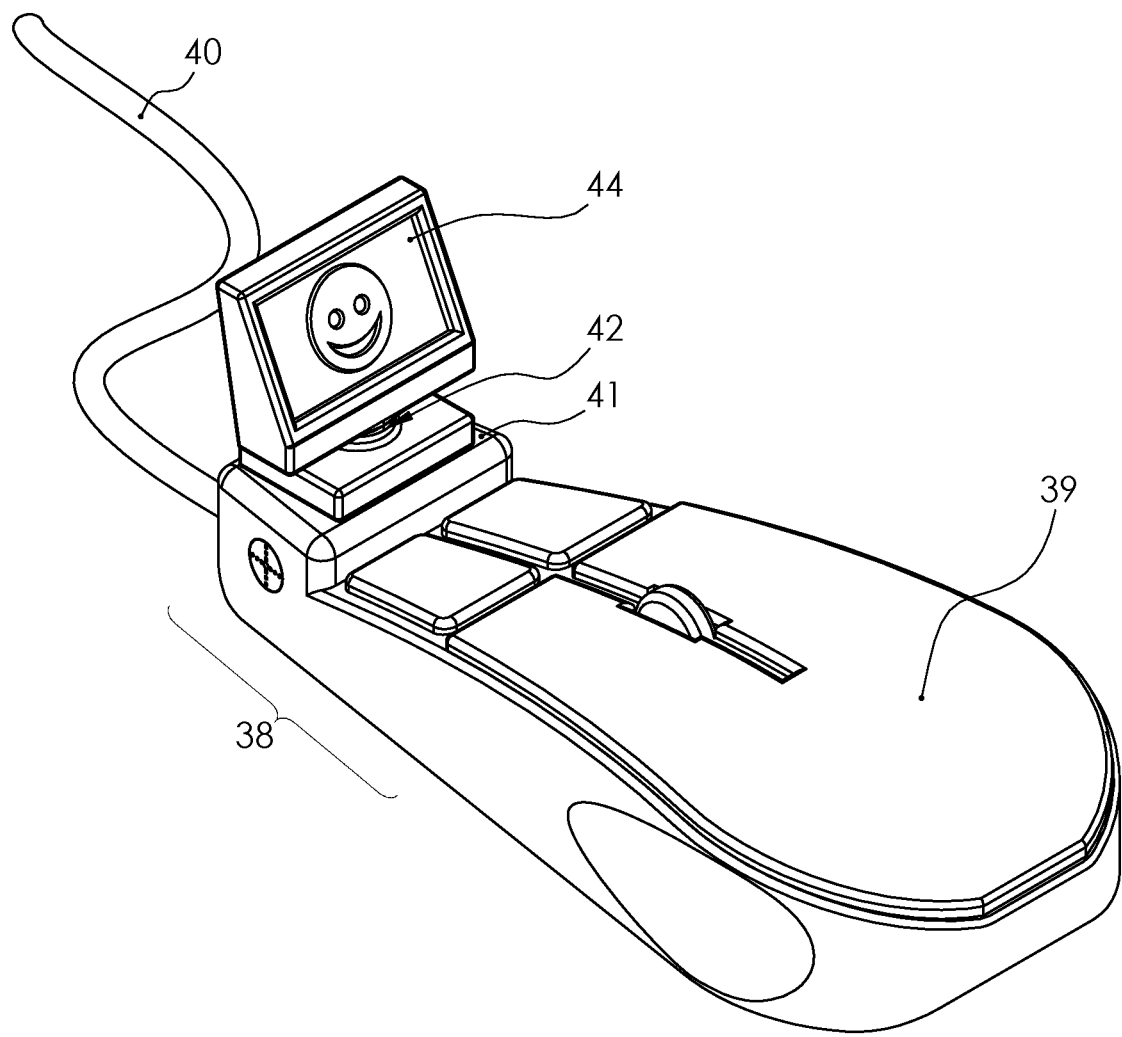
FIG. 3 is an illustration of the unibody design embodiment of is the present invention with a monitor installed.

FIG. 3 shows the unibody mouse of the present invention with a monitor display 44 attached to the hub section 38 at the hub's frontal protuberance 41 of this invention, using a rotative monitor adapter 42, which has the ability to rotate on an axis to different positions determined by the user. In this configuration the monitor display 44 acts as an external and additional display of the computer or any other type of apparatus to increase productivity, assist in communication and function as an additional User Interface with the cloud and computer. A power, audio, video and data cable 40 can be connected to the computer. The pointing device is housed in the main frame section 39.

Figure 4A:
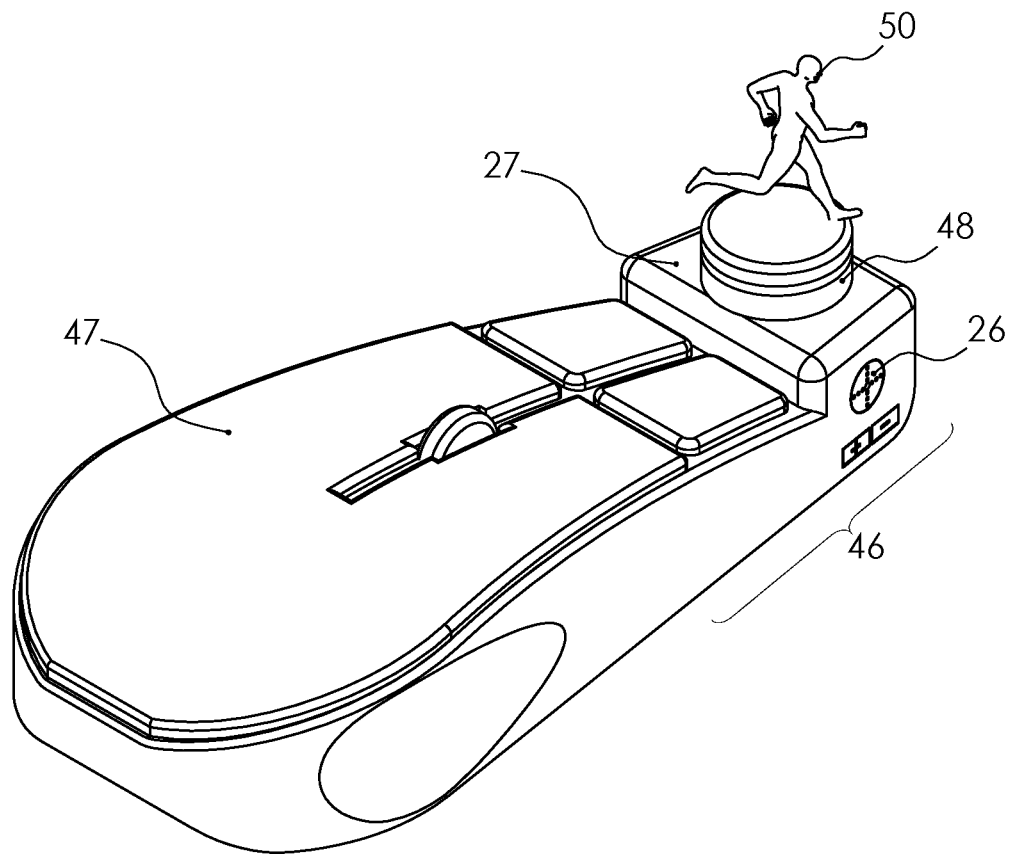
FIG. 4A is an illustration of the unibody design of the present invention with a connected interchangeable figurine.
Figure 4B:
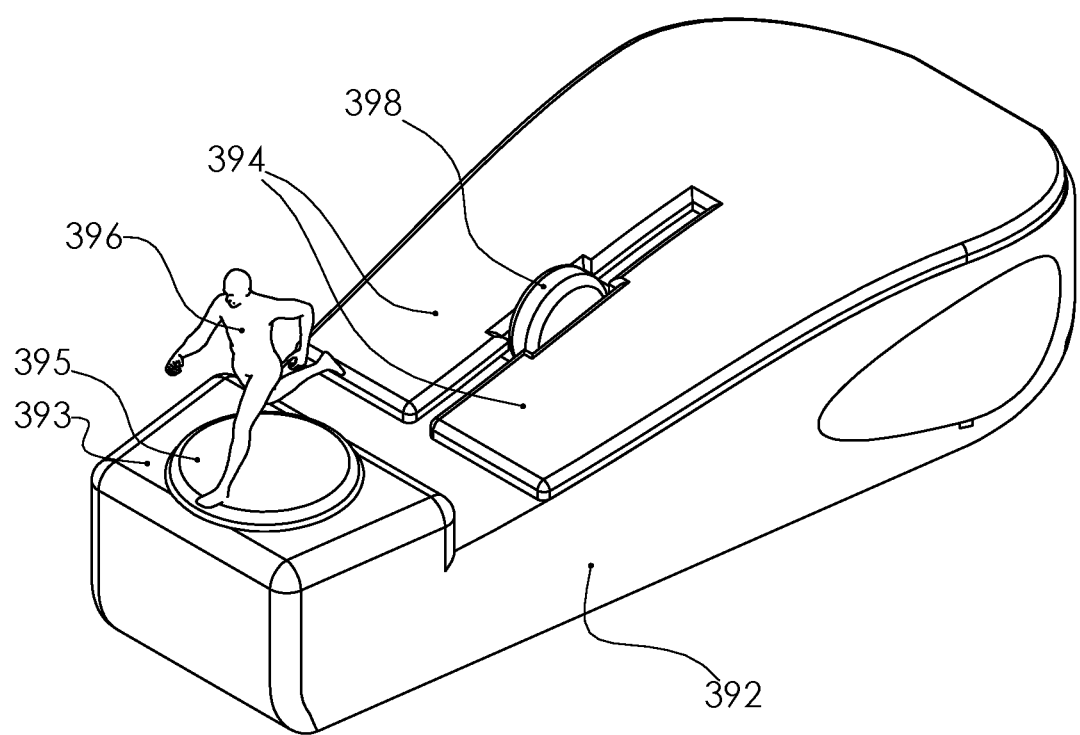
FIG. 4B is an illustration with a fixed connected figurine.

FIG. 4A is the unibody mouse of the present invention with a character or figurine 50 fixedly connected to the present invention, or interchangeably connected to present invention by, but not limited to, an interchangeable magnetic base 48 as an option, to the top surface 27 of the hub section 46. The figurines or any other type of installed accessories serves several functions, including characters that represent people from movies or comic heroes or heroines for instance, or a brand representation, custom names, 3D photos or other visual or functional accessories. The present invention includes a system which identifies the figurines 50 using technology such as RFID (radio frequency identification), Bluetooth, Wi-Fi, etc. features to download and reproduce voices, songs, lights, to be emitted from the speaker 26 of the hub section 46. The main frame of the mouse is indicated by reference number 47. FIG. 4B is an illustration of the unibody design embodiment of the present invention 392, with a computer mouse including, the right and left control buttons 394, the scroll wheel 398, and a fixed or interchangeable figurine 396 mounted in the hub section, preferably on the top surface 393. As shown, the figurine includes a character or other structure extending from a base area 395 of the figurine where the character or structure is connected to the base area 395. The fixed or interchangeable figurine 396 is mounted to the hub section by any of the methods and designs described and referenced herein, including by providing physical/mechanical, electrical and power, video, sound, and data connections to the mouse of the present invention. The connections to the hub section include male or female styled connectors, or combinations thereof, within or under the base area 395 which provide for physical/mechanical, electrical and power, video, sound, and data connections noted herein. For a fixed figurine, physical attachment and fastening means such as those known in the art may be used, such as pins, screws, glues, fasteners, and various mechanical methods. The fixed or interchangeable figurine may also connect via Bluetooth or Wi-Fi to the mouse or other devices, including gaming consoles for transfer of data, sound, communications (both receipt and output thereof) with other devices. In this manner, the figurine 396 becomes a functional character as described above and herein.

Figure 5A:
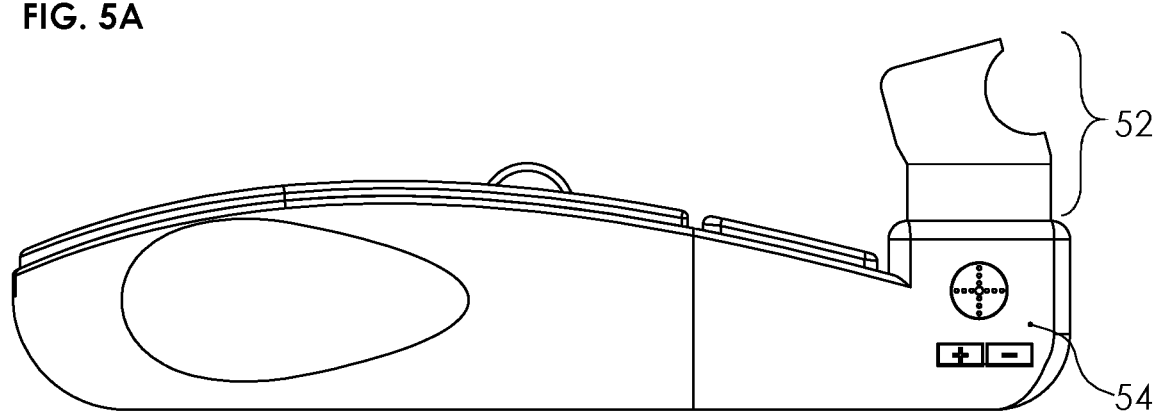
FIG. 5A is a side view and FIG. 5B is an isometric frontal view of the modular design embodiment of the present invention with an accessory for data acquisition.
Figure 5B:
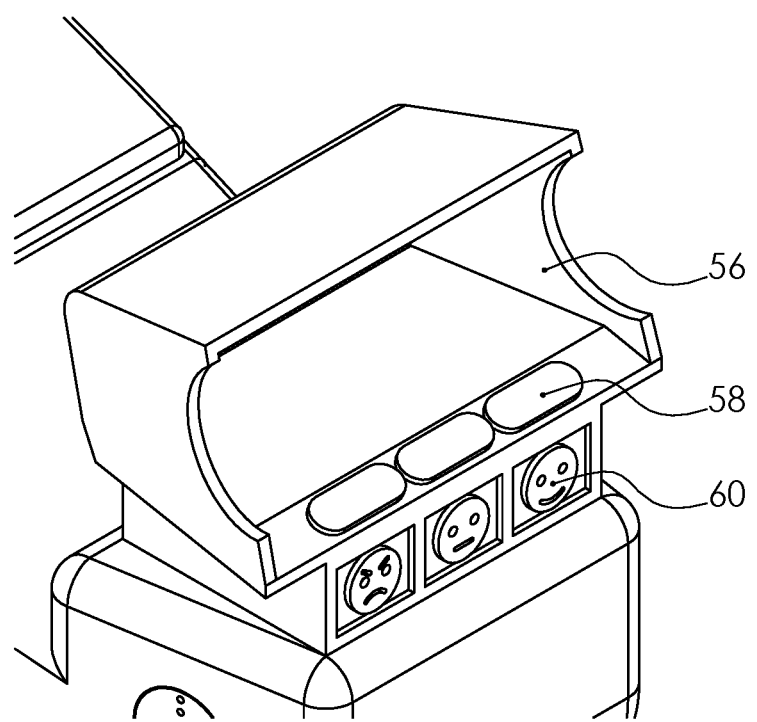

In FIGS. 5A and 5B, there is shown the hub section 54 of the modular mouse with a data entry peripheral 52 which allows data entry via input mechanical buttons 58 from third-party users. This type of peripheral 52 is designed for an enterprise, for instance, that wants to collect data from users or other parties. This type of peripheral can be modulated to be able to fit the needs of the business, for instance, to survey with confidentiality and a privacy shield 56, the customer satisfaction level by a graphic visualization 60 for the input buttons 58 in a point-of-sale, and transfer the data to the cloud using the IoT hub section 54 features. This data-entry module can be replaced by a touch-screen application as explained with respect to FIG. 3 above.

Figure 6A:
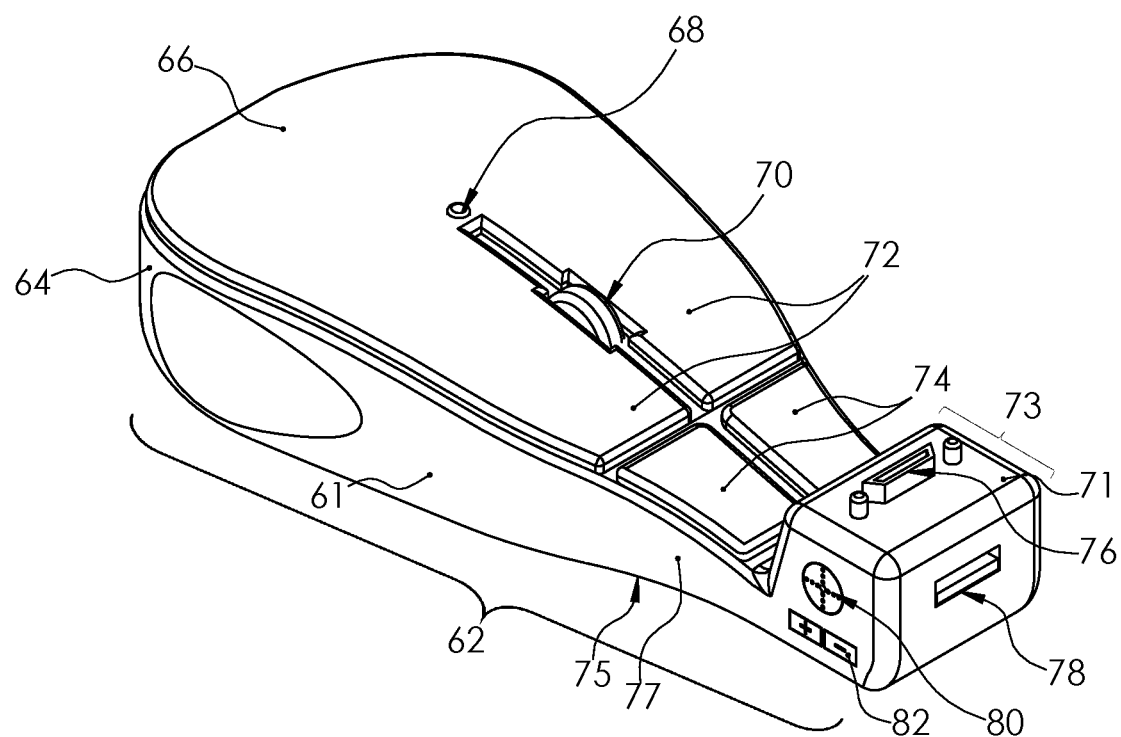
FIG. 6A illustrates the external parts and FIG. 6B illustrates the exploded view of the unibody design embodiment of the present invention.

FIG. 6A is the unibody mouse 62 which is designed in a singular body frame 61 that contains a main frame 64, interchangeable and customizable cover 66, power light indicator 68 that optionally is used to control the dpi (dots-per-inch) resolution of the optical sensor, a mouse scroll 70 and all the power and electronic components for the operations of this invention. The unibody mouse 61 increases internal capacity and allows the hub section 77 functions to be attached. It has a connecting port 76 on a surface 71 of a head section area 73 to allow the attachments of the hub section 77 functions, additional buttons 74, internal speakers 80, data, power and/or audio, video transfer, various USB type C or USB type A ports 78, and IoT (Internet of Things) capability, standard buttons 72, the common mouse wheel 70, and the speaker volume control 82. The main frame 61 of the mouse includes an extended and slightly indented, concave curved section 75 on the sides at or near each of the additional buttons 74 which narrows the width across this curved section area 75 of the mouse device of the present invention for improved user comfort and ease of operability of the overall device.

Figure 6B:
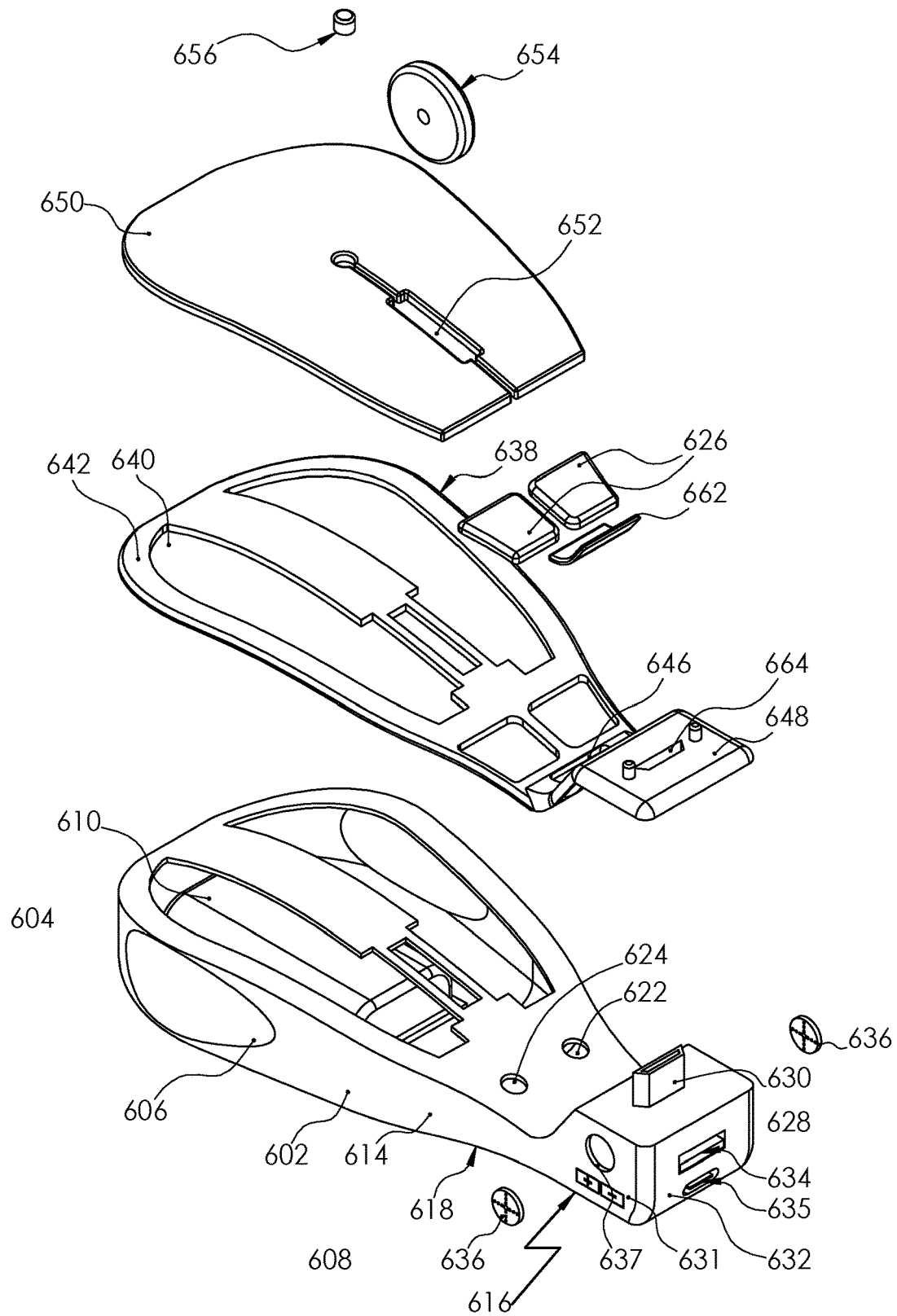

With reference to FIG. 6B, there is described in an exploded view, the components of the unibody mouse version of the present invention along with how the components are assembled. The unibody version of the mouse of the present invention includes a bottom tray 602, a mid-chassis piece 638 and a fixed or interchangeable top cover 650.

The bottom tray 602 includes a back end 604, a main frame section 606, and a neck section 608 extending from the main frame section 606. The main frame section includes a cavity 610 which stores the power/batteries, electronics and mechanical contacts which respond to user interaction and communicate with the computer or other devices.

The neck section 608 extends from and narrows from the main frame section 606 by a pair of a side walls 614 angled inward from the main frame section 606 and culminates in an upwardly extending head section 616. The neck section side walls 614 may be shaped to include a concave curve for ergonomic comfort and ease of use. The neck section 608 has a top surface 620 which includes one or more openings 622 which allow contact pins 624 to protrude through from the internal mechanics and receive contact from the function buttons 626 of mid-chassis piece 638 when the function buttons 626 are pressed by the user.

The head section 616 has a top surface 628 with an USB connecting port 630, a front end 632 with ports 634 for receiving USB type devices, media or other inputs or providing output and overall communications. On either side 631 of the head section 616 are located speaker covers 636 over sound openings 637.

The mid-chassis piece 638 includes an opening 640 within the back section 642 of the mid chassis 638 to overlay and align with the cavity of the bottom tray 610. The mid-chassis 638 also includes a pair of openings 644 to receive the corresponding pair of function buttons 626, and an opening 646 to receive a connector button 662. The mid-chassis piece 638 includes a head overlay 648 which overlays the head section 616 of the bottom tray 602. The head overlay 648 includes an opening 664 which aligns with the connecting USB port 630 on the top surface of head section 616. Together, these openings 630 and 664 receive an accessory, sensor, device, or character to connect data, video, audio, and/or power transmission. Preferably, the mid chassis piece 638 is thinner than the bottom tray 602 and matches with and aligns with the surface and perimeter of the bottom tray 602.

The top cover piece 650 is placed over the mid chassis piece 638 to cover the opening 640 of the mid-chassis piece 638 and the cavity 610 in the bottom tray main frame section 606. The top cover piece 650 includes a wheel cavity area 652 for receiving a mouse wheel 654 connected to the internal mechanics of the mouse and electronics for on screen scrolling. A top light 656 may also be included on the top cover piece 650 and attached to the internal electronics.

The following is one particular, non-limiting example, to provide relative dimensions for the present invention. The unibody mouse of the present invention has a length of approximately 4.5 to 6.0 inches with 5.3 inches preferred, a height of 0.91 inches at the highest point of the main frame section, and a height of approximately 0.75 to 1 inches at the head section of the hub section, with 0.81 inches preferred. The mid-chassis piece 638, which overlays the bottom tray 602 of the main frame 606, neck area 608 and hub head section 616 has a thickness of approximately 0.06 inches. The curved area 618 of the top surface leading from the main frame section 606 to the head area 616 of the hub section has a length of approximately 0.22 inches. A base piece may be added to the underside of the bottom tray 602 for ease of use on surfaces and has a length which is less than the overall length of the mouse of the present invention, of approximately 5 inches. The mouse wheel 654 has a radius of curvature of approximately 0.5 inches and a width of 0.13 inches. The width of the mouse of the present invention is approximately 2.0 inches across the back area and approximately 0.88 inches across the front of the head section. The additional mouse function buttons 626 have dimensions of approximately 0.43 inches by 0.49 inches across at their widest part. The connector button 662 has a width of approximately 0.64 inches across. The centrally located opening 630 (which receives the peripheral or character) in the head section 616 of the hub section has a radius of curvature of approximately 0.14 inches. Similarly, in a non-limiting example, when the unibody or the modular frame design is just used for the application of installing fixed or interchangeable figurines on the hub section, then, the approximate length of the present invention is between 5 to 6 inches with 5.5 inches preferred, the height of the figurines is between 1 to 2 inches with 1.75 inches preferred. The head section 631 is plain or elevated depending on the figurine or accessory to install, and the accessory may be installed over bases and made of plastic or other material that not break easily. The industrial design of the present invention is accommodated to the purpose of use, for instance, if the application is for the installation of figurines, then, the additional control buttons 626, 662, the speaker, the USB port 634 and the input port 635 are not included in the design. See FIG. 4B. Similarly, in a non-limiting example, the length of the hub section in the modular design of this invention, would be between 2 to 3 inches with 2.7 inch preferred.

Similarly, in a non-limiting example, the modular version of the mouse of the present invention (FIGS. 2A and 2B) may be of similar dimensions to those indicated above for the unibody version of the mouse. The modular version is approximately between one fourth to three fourths of an inch, with half an inch preferred, longer than the unibody frame version.

Figures 7A, 7B:
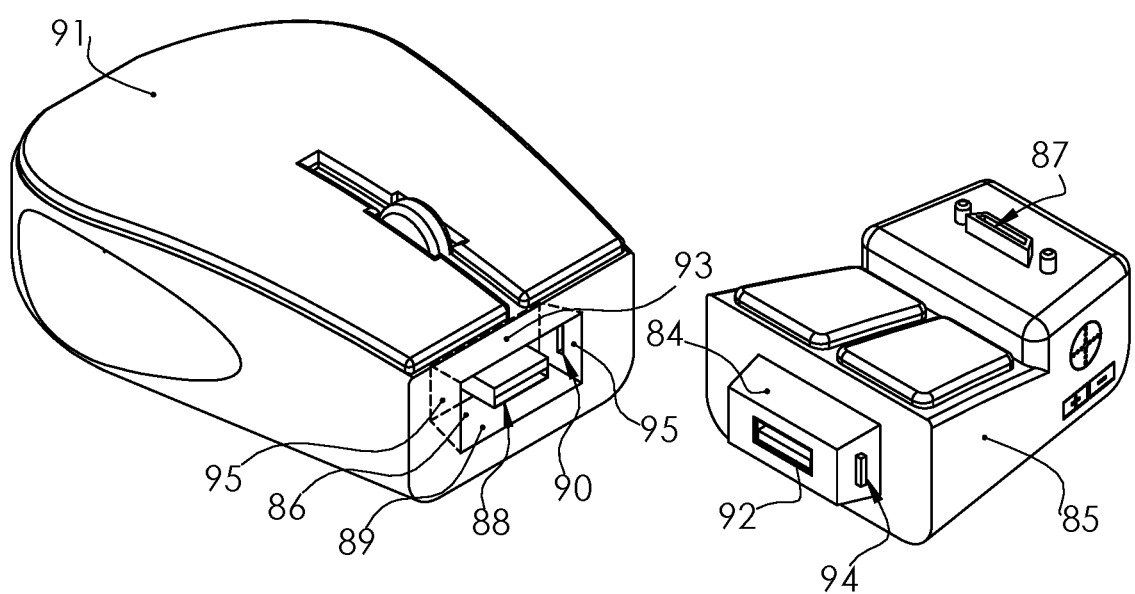
FIGS. 7A and 7B illustrate a mechanical connection option between the hub section and the main frame of the modular design embodiment of the present invention.
Figure 8A:
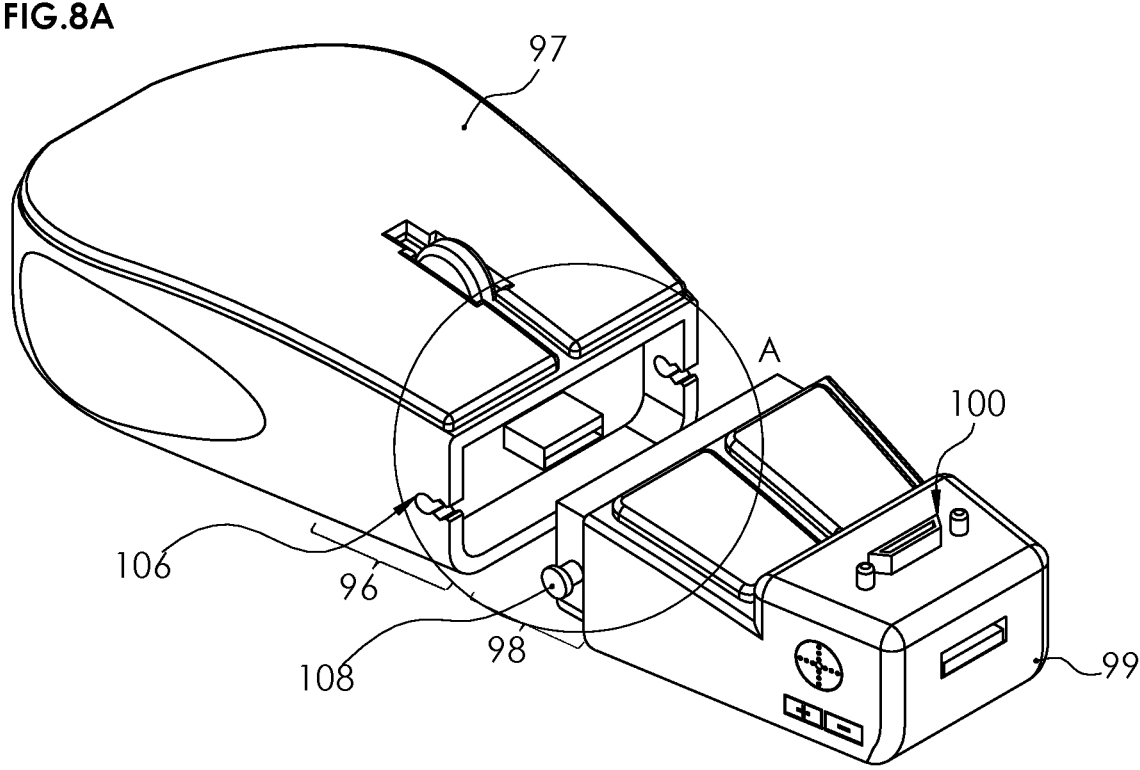
FIGS. 8A and 8B illustrate a groove and a pin extrusion connection option between the hub section and the main frame of the modular design embodiment of the present invention.
Figure 8B:
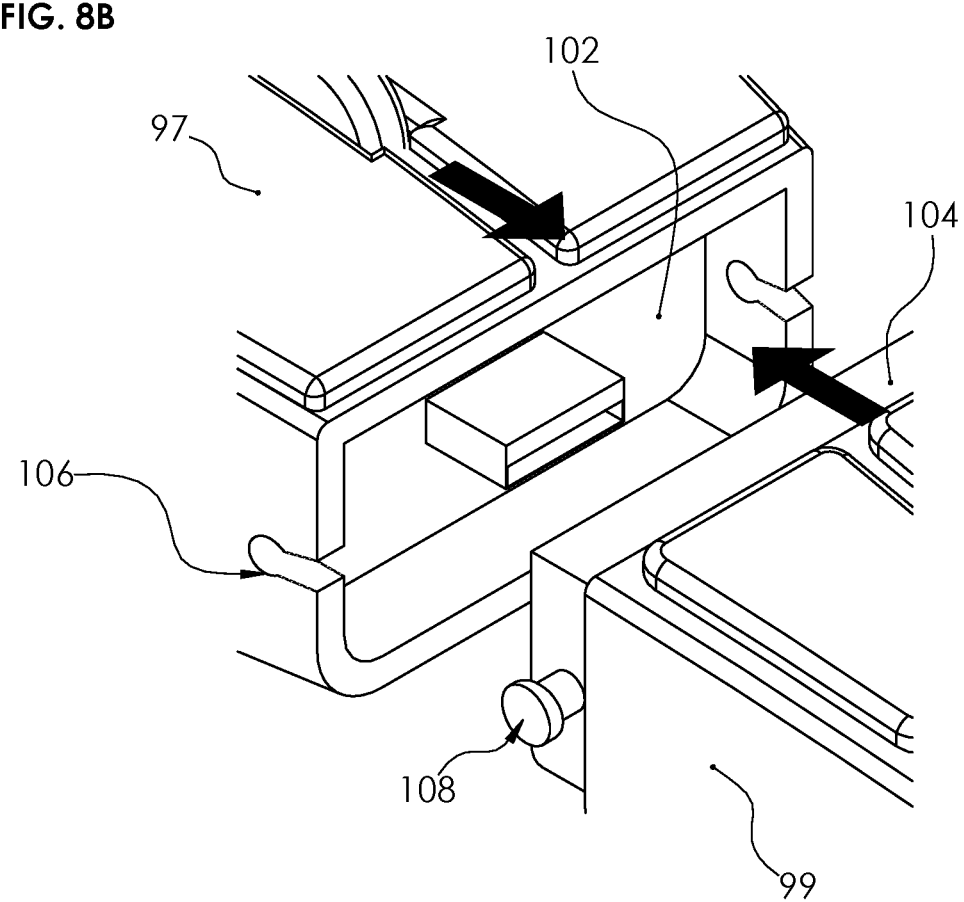

The following mechanical connector options for use with and in the present invention will now be discussed which form the connections between the main frame and the hub section with reference to the drawings. FIGS. 7A and 7B illustrate the mechanical port connections of the hub section with the main frame of the modular mouse. It securely and safely connects the opening 86 of the main frame with the hub section extrusion 84 which extends from the hub section 85. The opening 86 for receiving the hub section extrusion 84 is defined by an inner bottom surface 89, an inner top surface 93, and a pair of inner side walls 95 within the main frame. The extension 84 of the hub section 85 is a press to fit type connector and is user friendly to connect an included USB type receiver port 92 with a corresponding USB type male connector 88 on the main frame 91 of this invention, and then disconnect both parts, while also allowing for both data, audio/video and/or power transfer when connected. The hub section 85 includes a secondary mechanical extrusion 94 protruding from each side of the hub section to improve the mechanical attachment to the main frame at a corresponding inner side receptor 90 located on each of the inner side walls of the main frame within the opening 86, which is an inverse cavity geometrically designed to match the extension section 84 so that extension 84 fits inside of the main frame of the modular design of this invention. The secondary mechanical extrusion 94 may be of a different material from extension section 84 to ensure a solid connection in receptor 90. When extension 84 is placed in a press to fit manner into cavity 86, the USB type port 92 mates with the male connector 88 and the pair of side extensions 94 fit into the pair of receptors 90 in the cavity 86. The connector 87 on the head section of the hub section 85 may be an HDMI or other type or USB port such as a USB type C or 3.0. Other options different than the mechanical connector described in FIGS. 7A and 7B, can be used to attach the main frame to the hub section, as explained in FIGS. 8-11:

FIGS. 8A and 8B shows similarly, in a non-limiting example, an option to connect the main frame and the hub section of the modular design of the present invention. These figures show a version of a routed channel connector 106 located in the frontal area 96 of the main frame 97 of the modular mouse of this invention. The male connection end is composed of a pin extrusion 108 (FIG. 8A and FIG. 8B respectively), in the connection area 98 extending from each of the side walls of the hub section 99, which slots an extrusion 104 of the hub section into the cavity 102 of the main frame and guides the pins 108 into a press-to-fit hole for a secure connection of the hub section 99. This allows the user to connect peripherals or accessories at the top surface of the hub section 99 with power, data and/or audio, video signals in the accessory input port 100. The routed channel connector 106 is located on each of the side walls of the main frame 97 and may be a toothed path, such as FIG. 8A or a smooth angled path (FIG. 8B) made of elastic material for receiving the respective pin extrusions 108. At the end of either the toothed or smooth angled path is an opening for receiving the pins 108, and press-to-fit them and lock the hub section 99 with the mouse main frame 97. To disconnect the hub section 99 from the main frame 97, the hub section 99 is manually pulled out from the main frame 97. The main frame receiver connector 102 is manufactured with an indicated amount of material removed from the central axis of the side walls of the connector to create the routed channel 106 to receive the hub section connector 104.

Figure 9A:
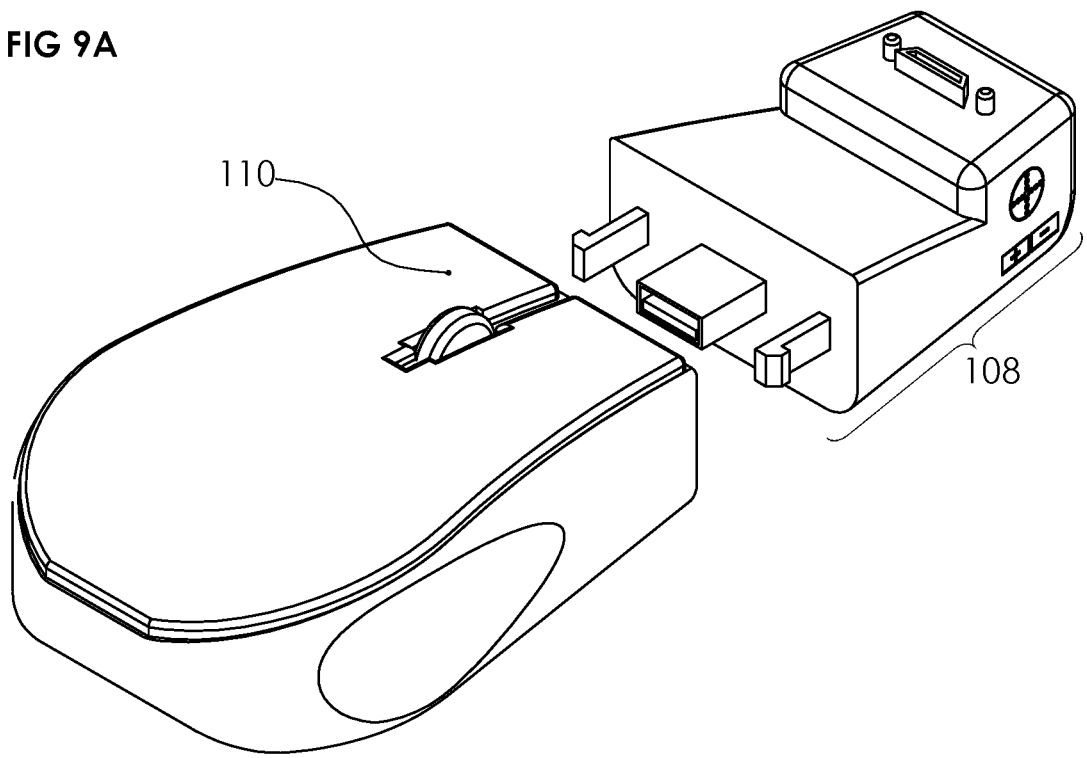
FIGS. 9A and 9B are illustrations of a snap hook connection option between the hub section and the main frame of the modular design embodiment of the present invention.
Figure 9B:
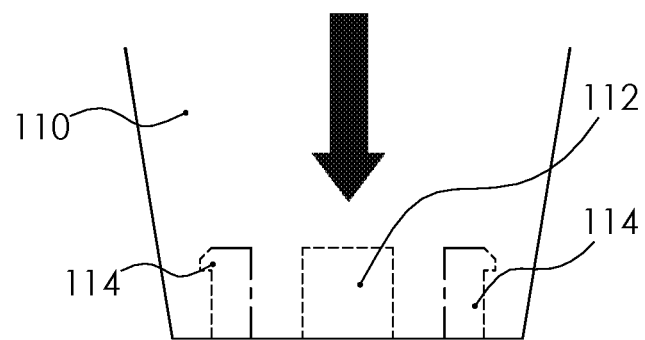
Figure 9B:
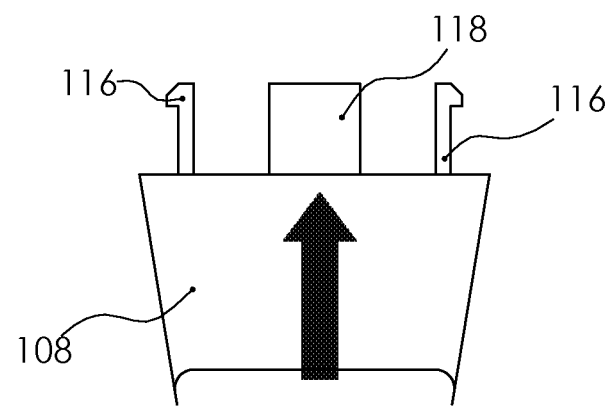

FIGS. 9A and 9B similarly, in a non-limiting example, shows an option to connect the main frame and the hub section of the modular design of the present invention. These figures show a snap hook connection that is designed with prongs 116 that protrude from the hub section 108 and fit into corresponding holes 114 on the main frame 110. When the prongs snaps 116 of the hub section 108 enter into the holes 114 of the main frame 110, and lock them, thereby allowing a firm connection of the hub section USB port 118 and the main frame USB port 112 to transfer power, audio, video and/or data signals. This illustrates a mechanical connection that also uses elastic material properties to securely mate the main frame 110 and the hub section 108. The male end of this connection has the power, input, and/or data transfer connector 118 and an extrusion prong 116 on either side of the data transfer connector 118. The female end contains the data, input, and/or power connector 112 and cavities 114 that are equal to the inverse of the respective extrusion prongs 116. The extrusions 116 on the male end mate into their respective cavity 114 on the female end and are designed in such a way that the user can access the extrusions 116 once mated (see, FIG. 10B)—, and by applying leverage, can release the extrusions from the cavity. This can be from the extrusions 116 extending outside the side walls of the mouse main frame 110.

Figure 10A:
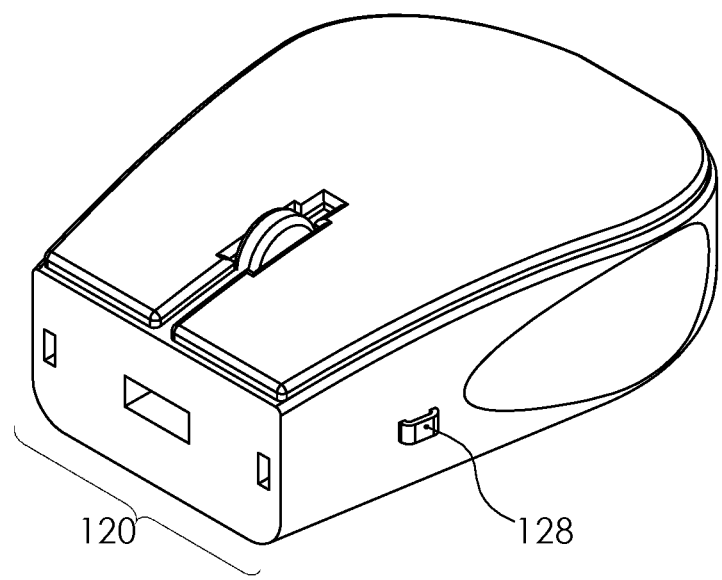
FIGS. 10A and 10B are illustrations of a spring clips connection option between the hub section and the main frame of the modular design embodiment of the present invention.
Figure 10B:
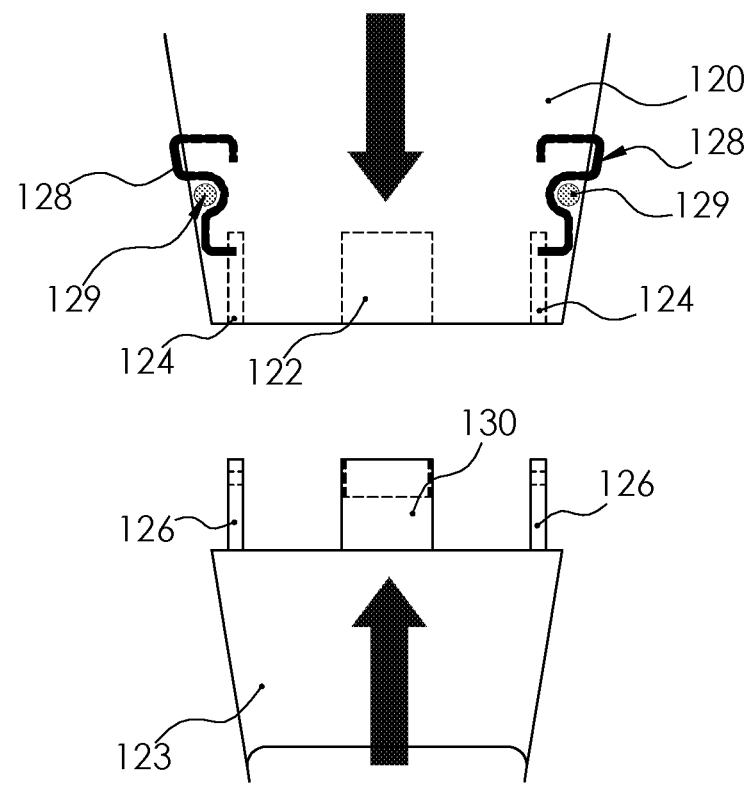

FIGS. 10A and 10B similarly, in a non-limiting example, shows another option to connect the main frame and the hub section of the modular design of this invention. These figures illustrate spring clips 128 connections for the present invention which are unique form clips inserted within the main frame 120 that use the material property for elastic action. FIG. 10B is a top view of the main frame 120 and a top view of the hub section 123. The hub section 123 has pins 126 which enter the grooves 124 that mate with the corresponding clips 128 of the main frame to secure the connection. The user pinches the spring clips 128 to release the connection between the main frame 120 and the hub section 123. This is a mechanical connection manufactured from a material with elastic properties. The novelty of the clips is in the geometry that when pressure is applied to the broad side of the clip, the mating face that connects to extrusions 126, move to release the hub section port 130 from the main frame port 122. Power, data and/or audio/video transfer are made through the USB type C or USB Type A port or any other wireless method.

Figure 11A:
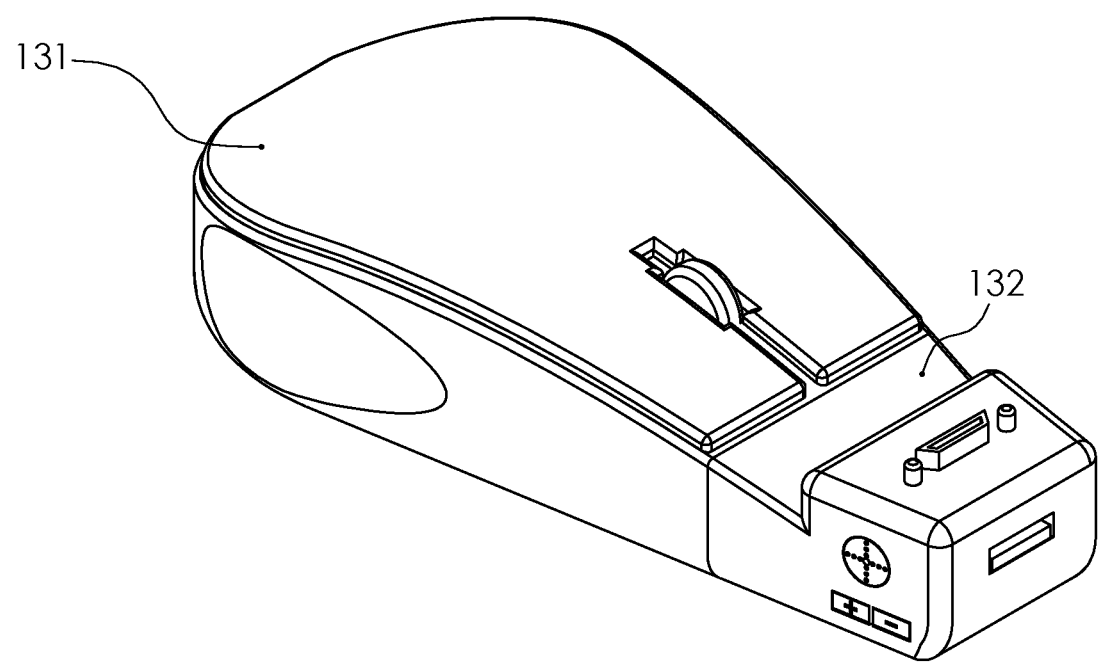
FIGS. 11A and 11B are illustrations of a magnetic lock connection option between the hub section and the main frame of the modular design embodiment of the present invention.
Figure 11B:
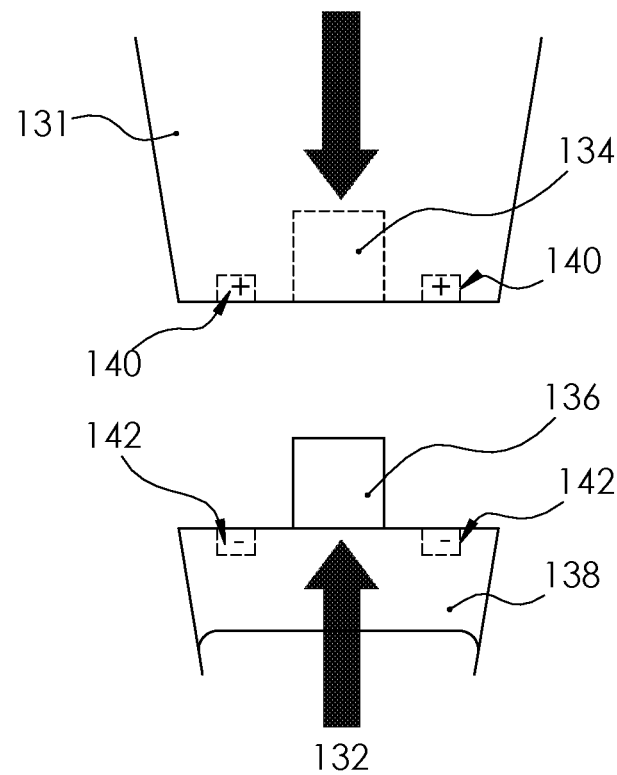

FIGS. 11A and 11B similarly, in a non-limiting example, shows another option to connect the main frame and the hub section of the modular design of the present invention. These figures show a connection with a magnetic lock for use in the present invention that is composed of a magnetic lining inlay/inserts 142 within the hub section 138 and also by corresponding magnetic inlay/inserts 140 inside of the main frame 131. FIG. 11B is a top view of the main frame 131 through its top surface. When the hub section 138 is moved in direction arrow 132 of the main frame, then both frames are magnetically connected allowing the power, inputs, and data transfer through the USB port 134 of the main frame and port 136 of the hub section 138.

The following FIGS. 12 through 23 provides description of how to transfer power, data and/or video signals and attach, in non-limiting examples, accessories to the main frame and the hub section of the unibody and modular designs of this invention, without limiting to, figurines (characters), sensors, monitors, computers and other devices. The connections are mechanical and/or magnetic, and include the transfer of power, audio, video and/or data features, when applicable.

Figure 12:
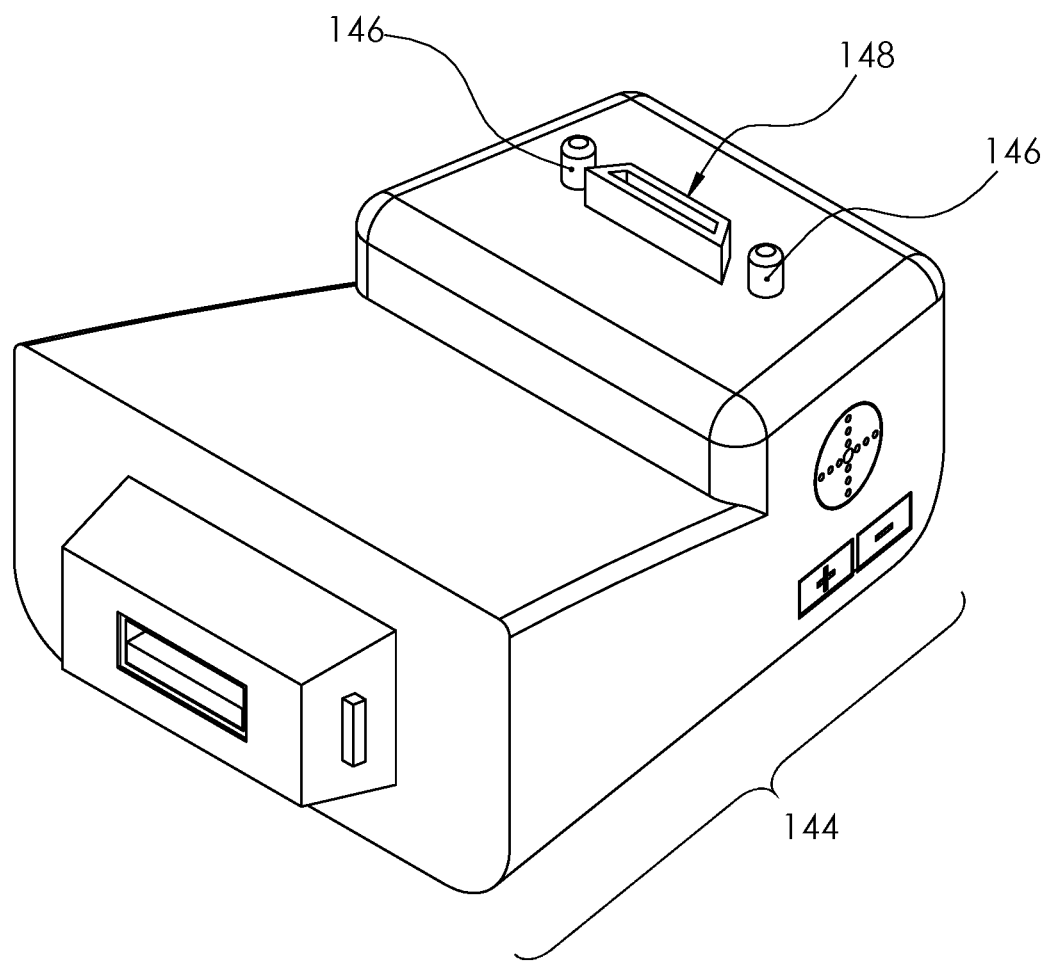
FIG. 12 illustrates the hub section of the modular design embodiment of the present invention.

FIG. 12 is the hub section 144 of the modular mouse of the present invention, which includes a data, audio, video and/or power connecting port 148, such as USB 2.0, USB 3.0, 3.1, Type C or similar upgrades, micro USB, HDMI, or other type of wireless transmission technologies, and one or more mechanical pins 146 to provide additional mechanical support to the accessories as explained in FIG. 13.

Figure 13A:
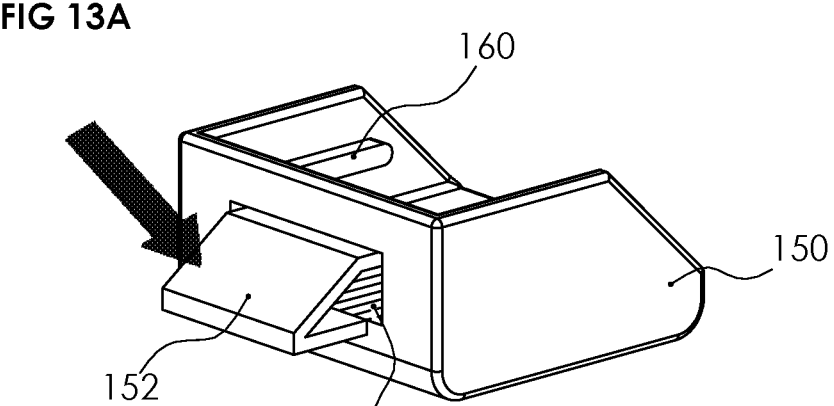
FIGS. 13A, 13B, and 13C illustrate views of an option of a female connector that is installed over the head of the hub section, to receive the installation of the male connector described in FIG. 15.
Figure 13B:
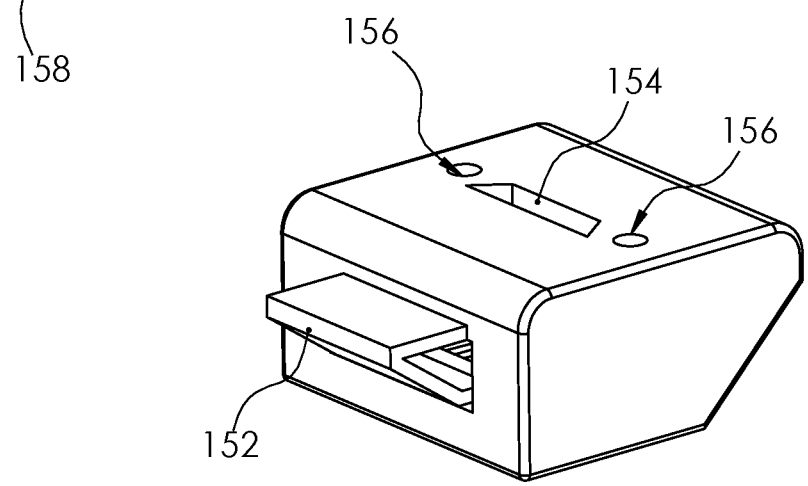
Figure 13C:
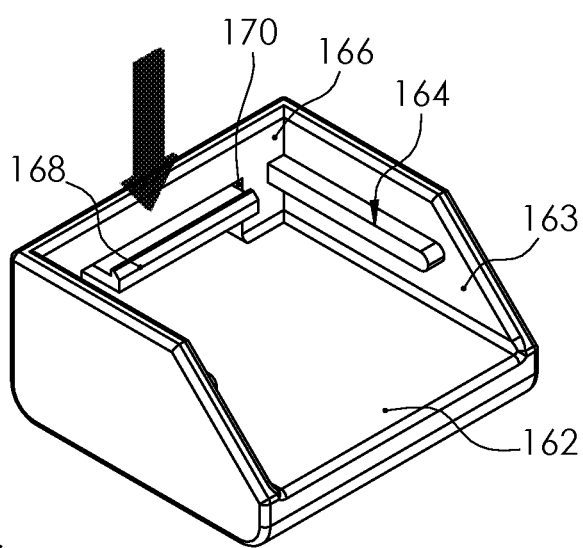

FIGS. 13A-C are isometric views of the external female connector 150 that is installed over the head of the hub section 144 of FIG. 12. This female connector can receive in opening 158 and bottom face 162, the male connector shown in FIG. 15 by pressing down the clip 152. The female connector 150 has one or more side bars 160, 164 on the internal side faces 163 (or alternatively on the bottom internal face 162) that guide the horizontal input slots 180 of the male connector 178 of FIG. 15 until it touches the back wall 166. The male connector is released by pressing down the clip 152 and sliding it out. On the underside of the female connector 150 as shown in FIG. 13B, there is included a receiving opening 154 to cover the hub section connecting port, and openings/holes 156 to receive, the one or more pins 146 of FIG. 12 (two shown) for the installation in the hub section 144 of the same Figure. These openings 154 and 156 offer mechanical support between the hub section 144 of FIG. 12 and the female connector 150. FIG. 13C is a frontal isometric view of the female connector 150 which shows the back edge 168 of the flexible clip 152 protruding through the opening space 170 of the wall 166 of the female connector. The downward force on the clip, indicated by the arrows, permits the back edge 168 of the flexible clip 152 to bend down and then permit reception of the male connector shown in FIG. 15 to enter and be secured by the female connector and clip 152. The two side bars, such as the one shown at 164, guide the male connector over the base 162 of the female connector 150. One or more side bars may be used on corresponding sides. A similar downward force on the clip 152 releases the connection and allows the male connector to slide out.

Figure 14:
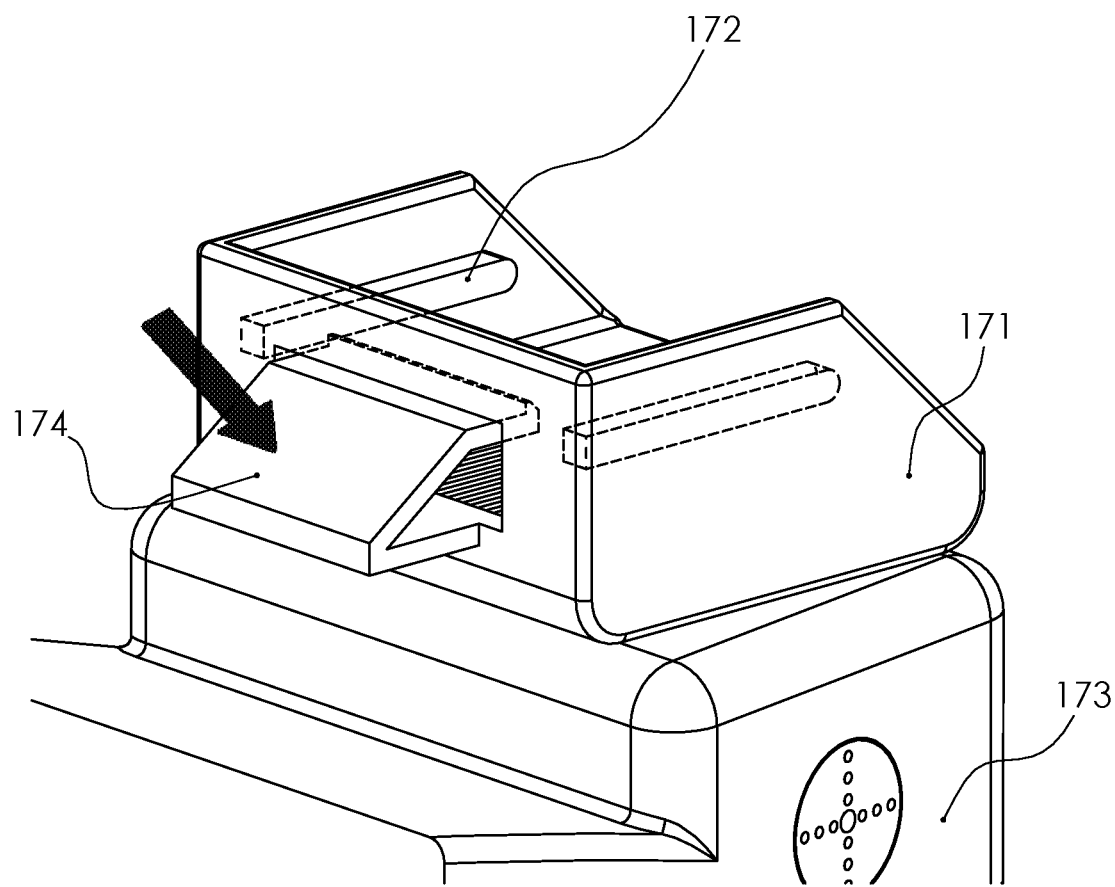
FIG. 14 is an illustration of the female connector of FIGS. 13A-C installed over the hub section of FIG. 12.

FIG. 14 shows the female connector 171 installed onto the hub section 173, of this invention, allowing to install peripherals such as characters or sensors and/or other devices. The male connector is released by pressing down the clip 174 and sliding it out. The bars 172 on the inside walls of female connector 171 connect with the corresponding grooves on the peripheral. Those of skill in the art would recognize that an inverse scenario of grooves or slots on the walls of the female connector could be used to mate with bars or protrusions on the peripheral.

Figure 15:
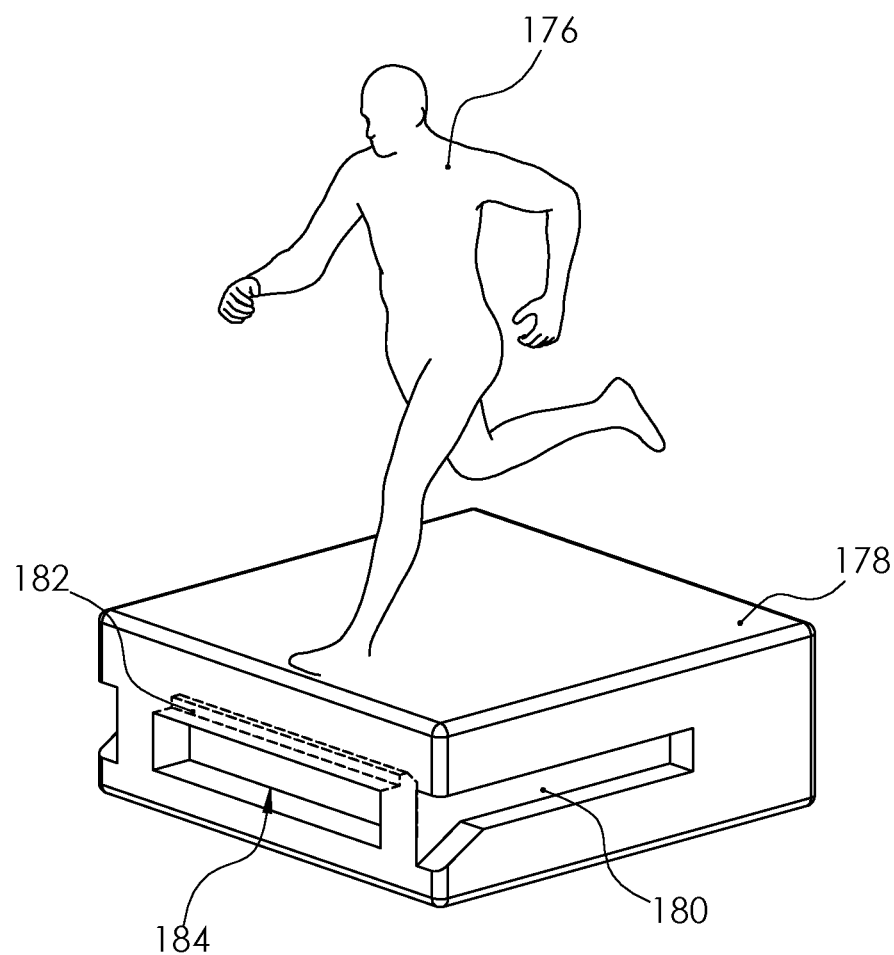
FIG. 15 is an illustration of an interchangeable male connector that fits in the female connector of FIG. 13A-C.

FIG. 15 shows an interchangeable male connector 178 that is placed over the peripheral, such as a figurine, or a sensor or other accessories 176 which can be installed. Corresponding slots 180 are located on each side of the male connector 178 to mate with the guide bars 164 of the female connector from FIG. 13 and forces the back upward protruding edge 168 of clip 174 (shown in FIG. 13C and FIG. 14) to enter through opening/hole 184 in the front wall of male connector 178 and firmly attach in and under the ridge section 182 when the clip is released. The clip 174 may be plastic, metal or other suitable material.

Figure 16A:
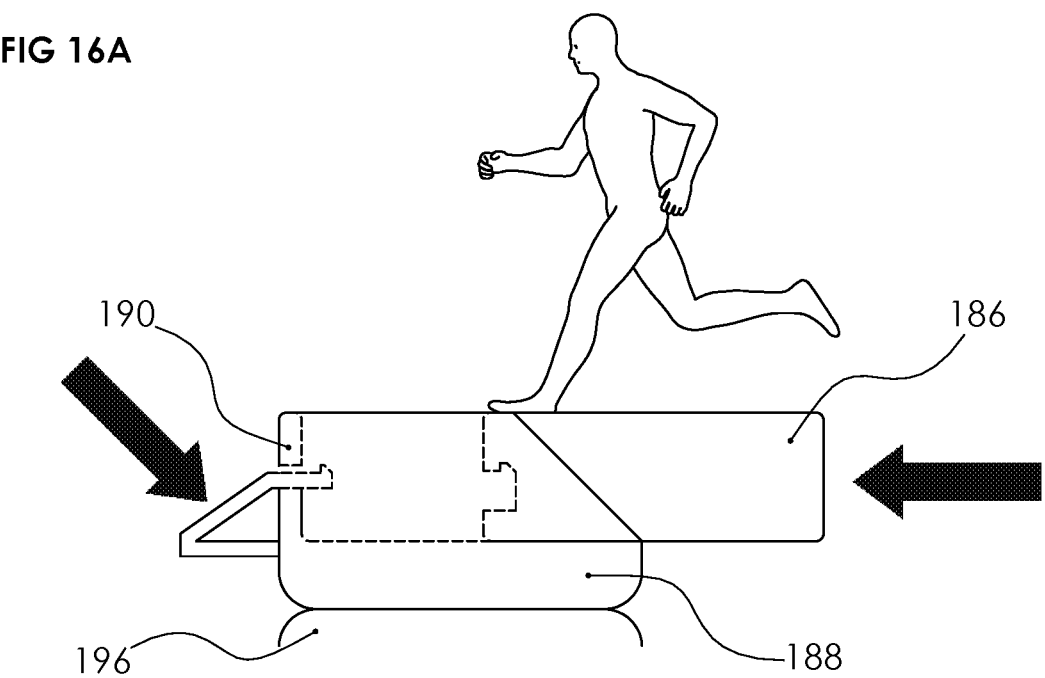
FIGS. 16A and 16B illustrate the installation of the male connector of FIG. 15 by sliding it into the female connector of FIG. 13A-C.
Figure 16B:
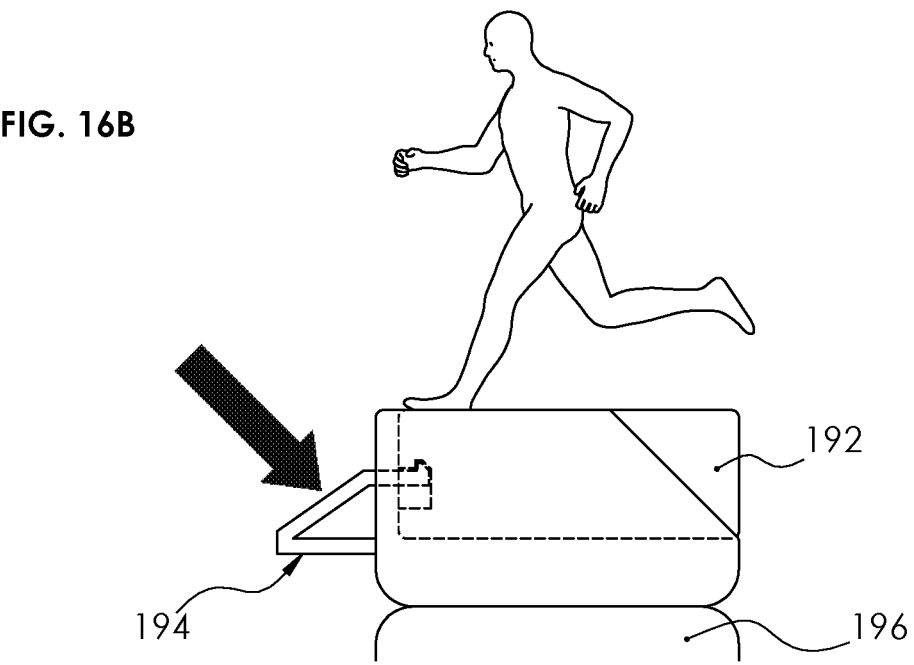

FIGS. 16A and 16B show how the male connector 186 supporting a character, sensor, accessory or peripheral, connects to the female connector 188 by sliding until it reaches the wall 190. By pressing and releasing the clip 194 with a downward force, the male connector 192 can be connected to, or disconnected from, the hub section 196.

Figure 17A:
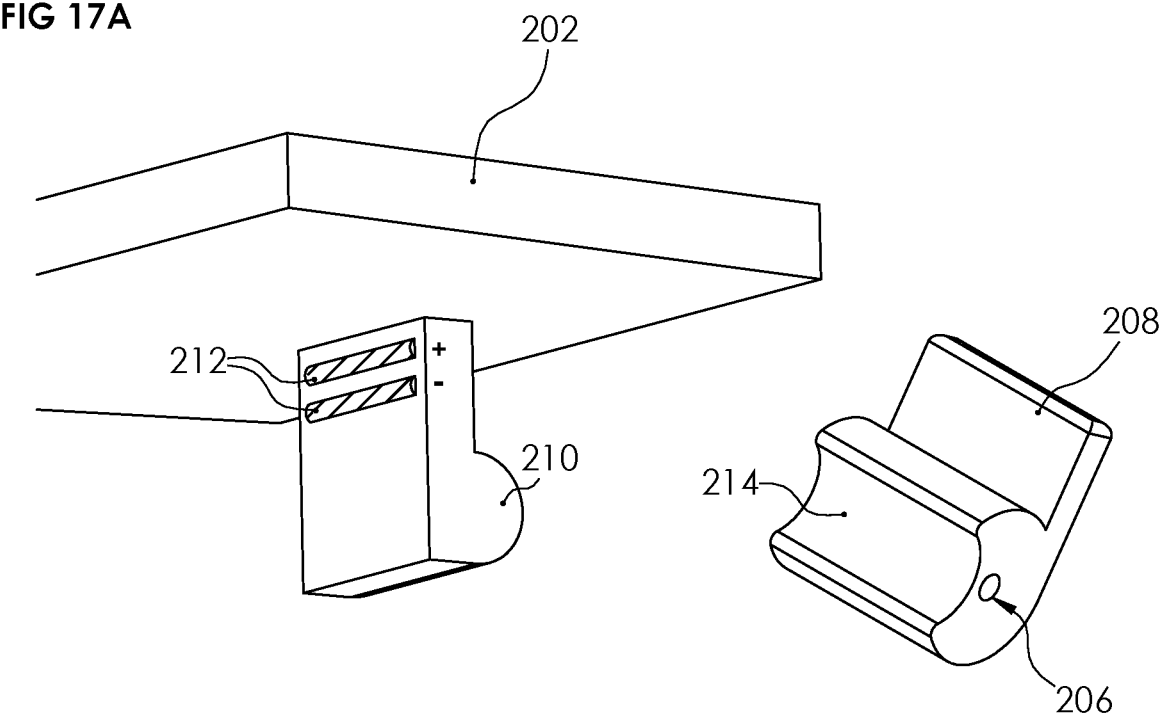
FIGS. 17A and 17B illustrate a power pin connection option, to install interchangeable bases of accessories in the hub section.
Figure 17B:
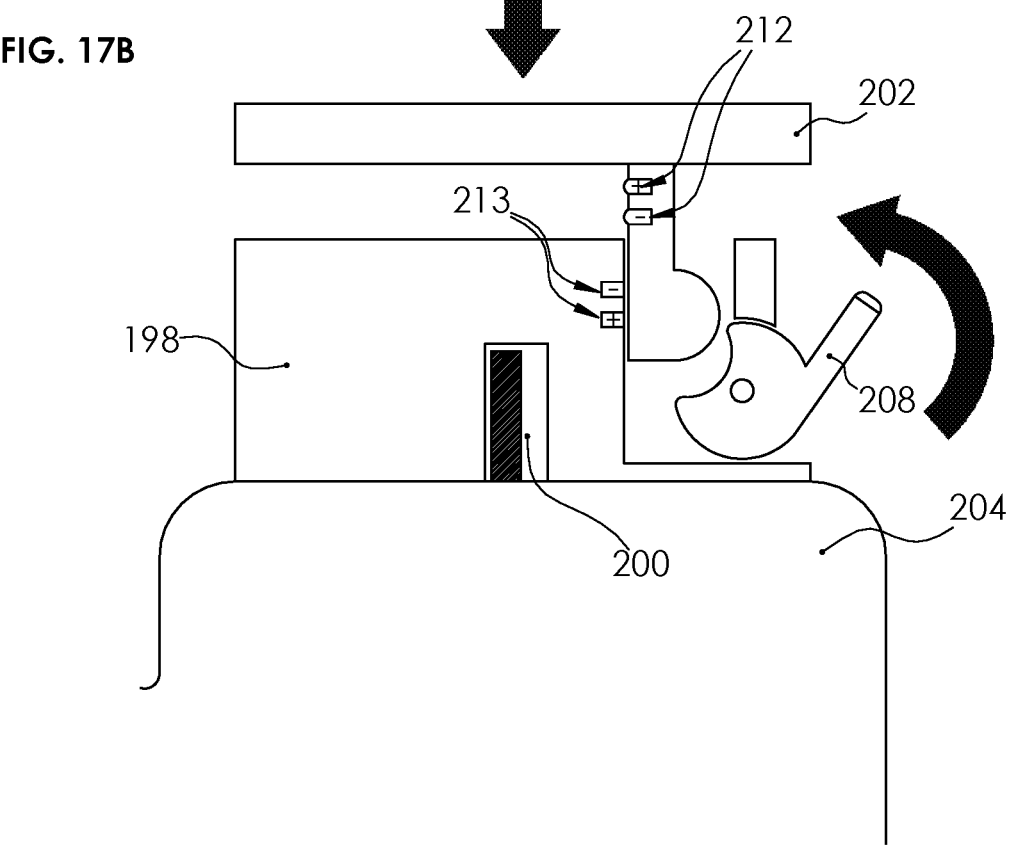
Figure 18:
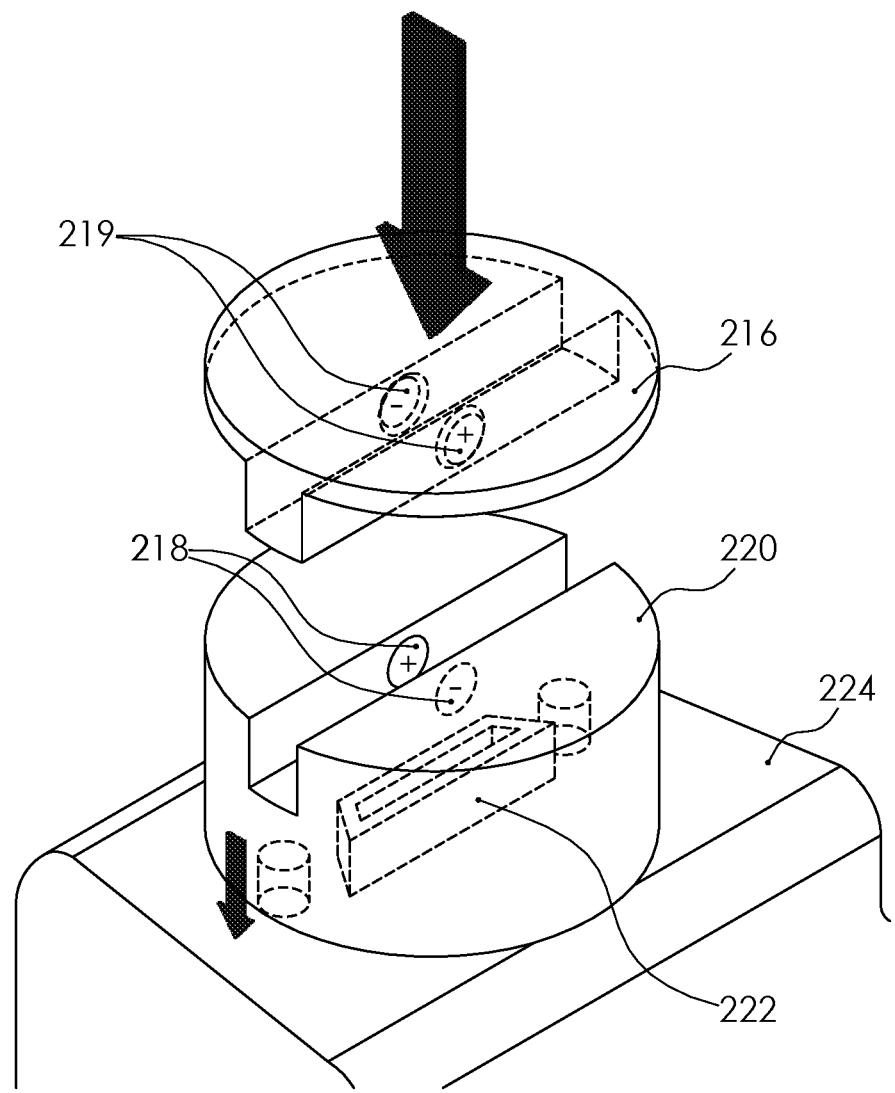
FIG. 18 is an illustration of a magnetic lock connection option, to install interchangeable bases in the hub section.

Other type of mechanical connectors can be used to attach characters, accessories, monitors and/or sensors to the hub section, such as the following options described in FIGS. 17 and 18.

Referring to FIGS. 17A and 17B, there is shown an electric power pin connection that is uniquely designed as a male connector pin 202 with a body that includes a round, circular or cylindrical shaped pin extrusion 210 at the end or on the surface of the pin which mates to the surface of a press-to-fit cam lock 214. Other shapes and configurations for the power pin are within the scope of the invention. The pin and extrusion end 210 are received by a female connector 198 which includes the cam lock 214 positioned within. The female connector 198 is installed onto the hub section 204, thereby receiving and covering the fixed data, audio, video and/or power transfer connector in the hole underneath 200 and on the base of the female connector 198. When the lever or clip 208 moves up or down, it rotates in the pivot 206 and permits to receive or release the male connector 202, indicated by arrows in FIG. 17B within the female connector 198. Power, audio, video and/or data connecting area 212, can provide energy, sound, video or signal data to the character or peripheral accessory installed over the male connector 202 when properly aligned with a connecting area of the female connector (for instance, as shown by negative and positive terminals 213 on FIG. 17B within female connector 198).

As described, FIGS. 17A and 17B embodies the power pin 210 to transfer power for the connected peripheral 202 and connected to data transfer connector 200 housed in FIG. 17A peripheral housing 204. This alternative locking mechanism for an adapter is controlled by the lever 208 that pivots on axis 206 that is revolve has a mating face 214 that contacts on the power pin face extrusion 210. Once engaged into female connector 198, power, video and/or data signals are transferred through leads 213 (for instance, the negative and positive terminal area in 198 of FIG. 17B) from the mouse into power pin leads 212. After the physical, electrical and data connections are made by the female and male connections, at some point it may be desirable to change, remove or turn off the peripheral attachment. This is accomplished as follows: by moving the lever 208 to a down position, the male connector 202 can be released and/or removed from the female connector with power, video and/or data connections no longer aligned, or by disconnecting the cable from the computer or external device. A new or different peripheral can be substituted into the female connector 198

Referring to FIG. 18, there is an alternative connection to FIGS. 17A and 17B, the connection that is composed of an electric and/or magnetic lining inserts 218 in the female connector 220, which mates with the opposite corresponding electric and/or magnetic lining inserts 219 in the male connector 216, securely attaching them. The female connector 220 has an open receptacle within and underneath to hold the data, power and/or video signal connector 222 of the hub section 224 of the present invention. The electric and/or magnetic leads 218 are used to engage and transfer power, video and/or data through housing 220 to the connector 216.

Accessories such as Figurines, monitors, sensors and/or other devices can be installed, fastened or attached onto the surface of the male connector 216, which can then receive the signals.

Figure 19A:
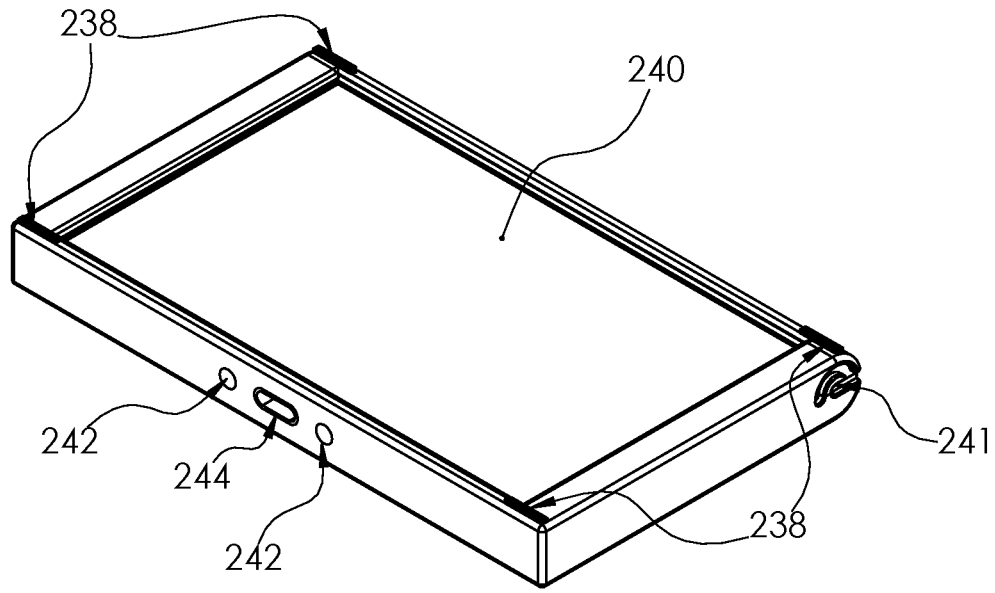
FIG. 19A illustrates a monitor display and FIG. 19B illustrates a rotative adapter and the hub section of the present invention
Figure 19B:
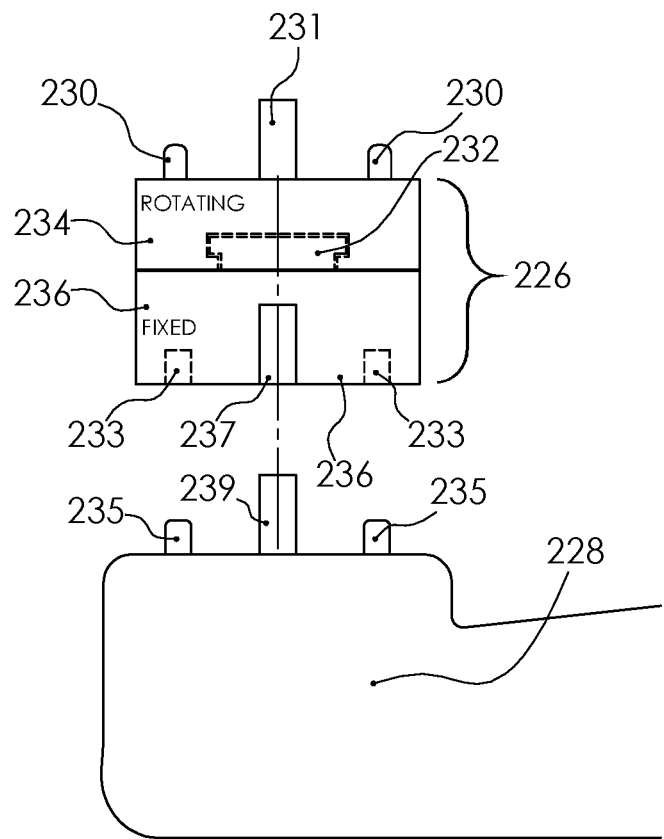

The mechanical connector for attaching a monitor to the hub section is now described. Referring to FIG. 19, there is shown how a monitor 240 can be connected to the hub section 228. Monitor's power, data and/or video USB connector 244 receives and is connected to the male port 231 through a rotative adapter 226 which has a housing and mechanic section 232 for the power, video and/or data cables. The rotating section 234 and fixed section 236 are connected through the housing and mechanical section 232, and permits to turn the monitor 240 to the angle where the user wants to put the visual display which is explained with respect to FIG. 20A. The rotative adapter 226 is connected to the power, video and/or data transfer connector 239 of FIG. 19 (and 248 in FIG. 20B) of the hub section 228 by connecting with female port/connector 237. A pair of openings 233 in the rotative adapter 226 receive mechanical pins 235 on top surface of the hub section 228. Monitor support holes 242 receive the mechanical pins 230 located on the upper area of the rotative adapter 226. The rotative adapter 226 can swing approximately 180 degrees to each side, and can provide power to the monitor, and transfer data, power and video signals both ways from the present invention to a computer or other device and vice versa. For applications involving a touch-screen monitor 240, the user or a third-party user can interact with the cloud or the computer or other apparatus, such as a gaming console, using this invention as an interface with the IoT. Magnetic attachments 238 can be located on the edge, corners or periphery of the monitor 240 and used for storing it as described below with reference to FIG. 21A. A mechanical guide(s) 241 installed on each side of the monitor 240 helps to align and maintain the monitor attached to this invention, when the monitor 240 is stored in a cavity located underneath the main frame or hub section (see FIGS. 21A and 21B) for additional mechanical support.

Figure 20A:
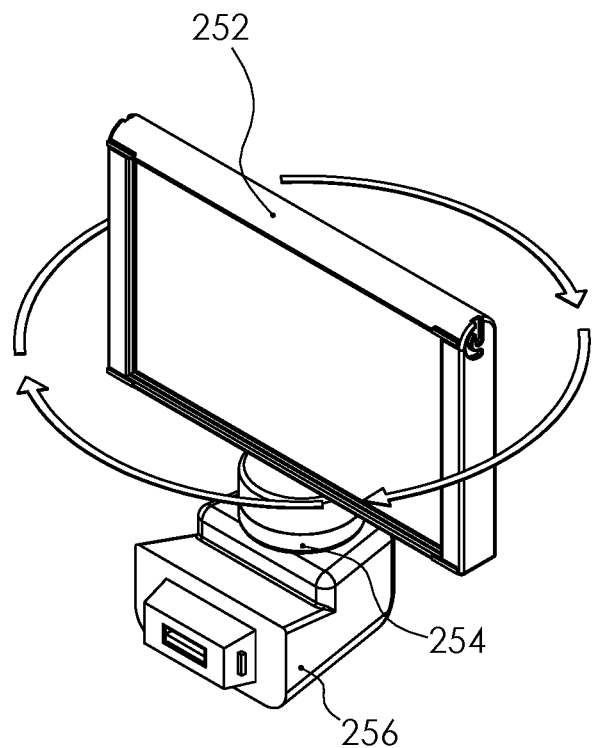
FIGS. 20A and 20B illustrate how the monitor display of FIG. 19A is installed onto the hub section of the modular design embodiment of the present invention by means of the rotative adapter of FIG. 19B.
Figure 20B:
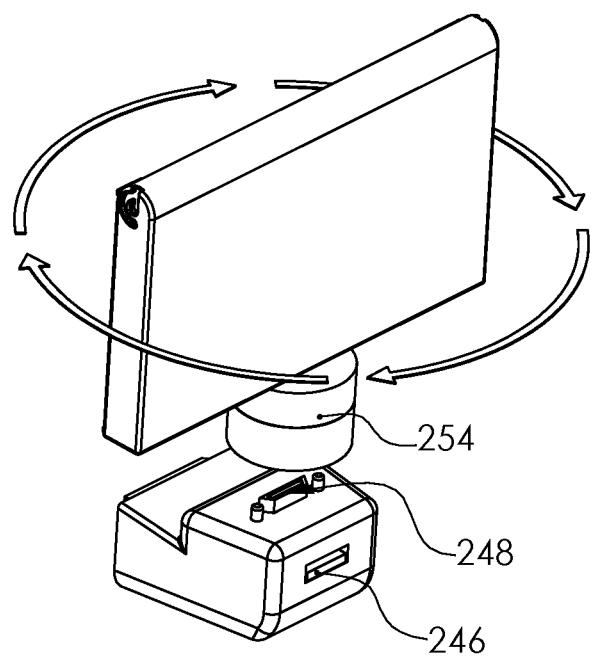

FIGS. 20A and 20B illustrates how the monitor 252 looks when it is mounted onto the hub section 256 of the modular mouse of the present invention, using the rotative adapter 254. The monitor 252 receives the power data and/or video signals when it is connected to the hub section's USB port 248. The hub section 256 receives the power, data and/or video signals from a computer or other apparatuses through the USB port 246 or via wireless using other commercial technologies for connectivity.

Figure 21A:
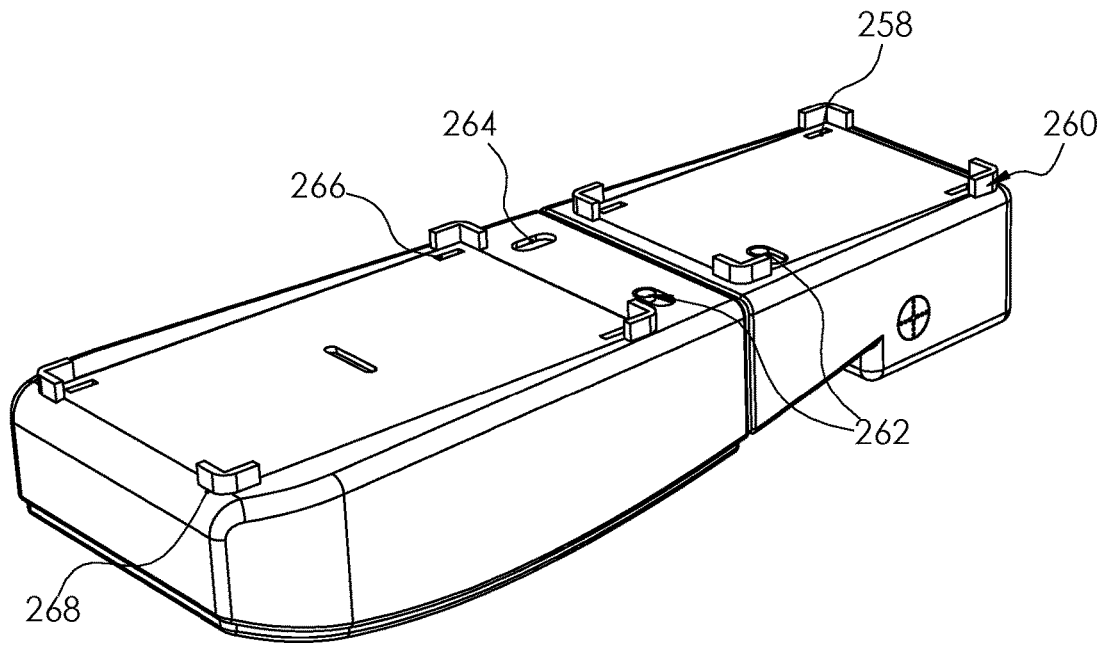
FIGS. 21A and 21B illustrates how two monitors (or other accessories) are attached underneath the main frame and the hub section of the modular design embodiment of the present invention, by means of magnets.
Figure 21B:
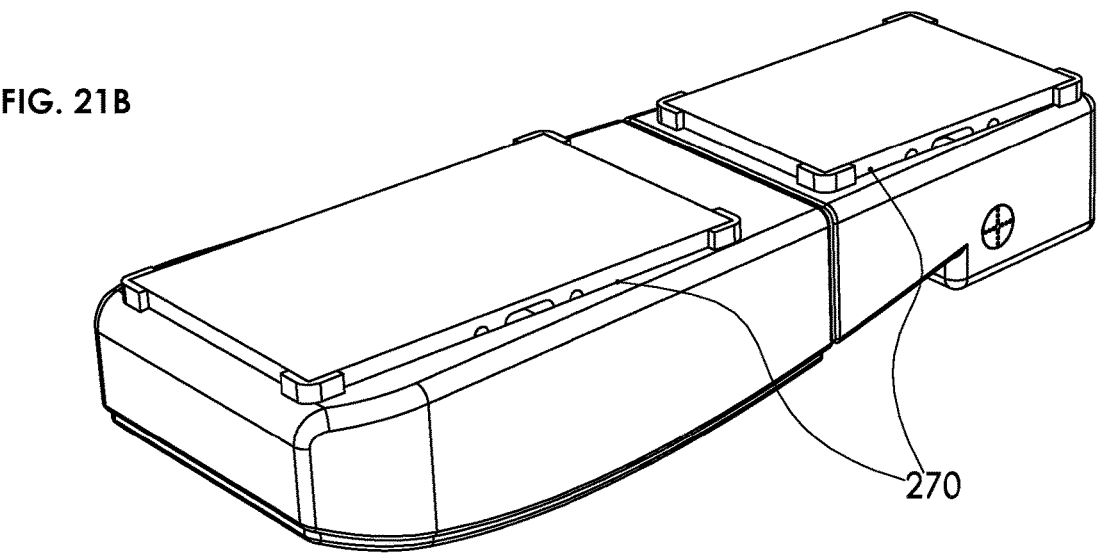

The magnetic or mechanical attachment options to support monitors or other accessories underneath the mouse of the present invention is now described. FIGS. 21A and 21B is the monitor or accessory magnetic connection option to the mouse. FIGS. 21A and 21B show how the peripheral monitor of FIG. 19 stores underneath the mouse of the present invention. By using various magnetic inlays 258 in the hub section, and magnetic inlays 266 in the main frame, two separate monitors or accessories can be installed and stored at the underside surface of the main frame and hub section of the mouse. The protrusions or stands 268 and 260, located in the corners underneath of the main frame and the hub section respectively, are higher than the height of the monitors or accessories, thereby protecting them from touching the desk surface and being scratched when they are stored underneath and the mouse of this invention is moving on a desk or other surface. The magnetic inlays 258, 266 can match the one or more magnetic attachments 238 from FIG. 19A. The modular mouse of the present invention has two sections 270 underneath and can hold up to two accessories such as monitors, sensors and/or advertising accessories by means of one or more magnets 266, such as four, in the main frame, and 4 magnets 258 in the hub section. The optical sensor 264 is not affected by the installation of an accessory underneath the main frame of this invention. Power switches 262 disconnect the power supply from the batteries or the computer to the main frame and the hub section and is not blocked by the monitor positioning. Body supports or plastic pads 268 and 260 are installed in the main frame and in the hub section respectively to allow disconnect of both frames and continue working independently at the same level surface. The user can disconnect the hub section, install the monitor and leave it permanent in one place. It can work for entertainment, multitasking, personal work performance and also in business meeting environments for instance when a computer user wants to show a file or video in the extended monitor mounted in the hub section of this invention, and do the presentation to other people, avoiding the others to see the user computer's monitor for privacy reasons.

Figure 22A:
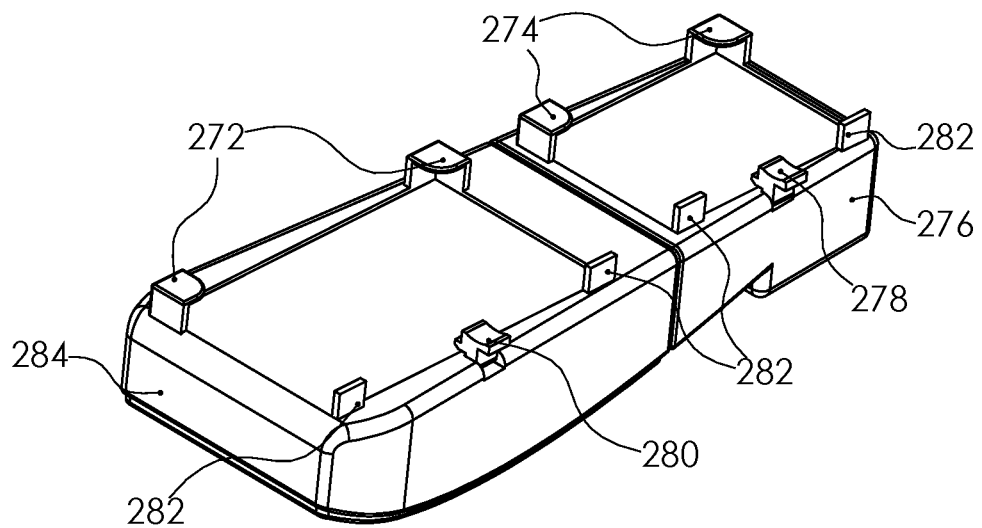
FIGS. 22A, 22B, and 22C illustrate how two monitors (or other accessories) can be attached underneath the main frame and/or the hub section of the modular design embodiment of the present invention, by means of mechanical supports.
Figure 22B:
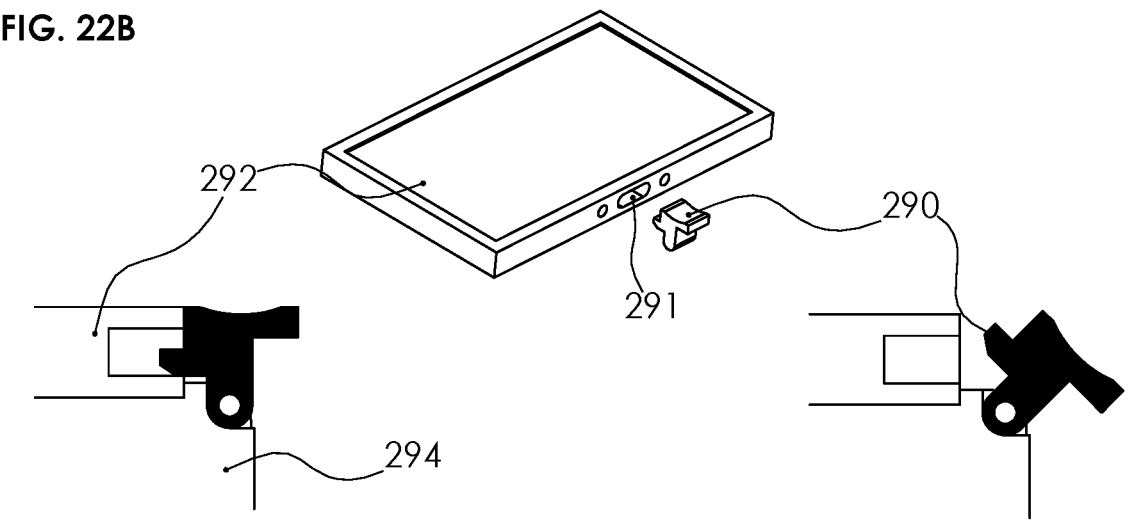
Figure 22C:
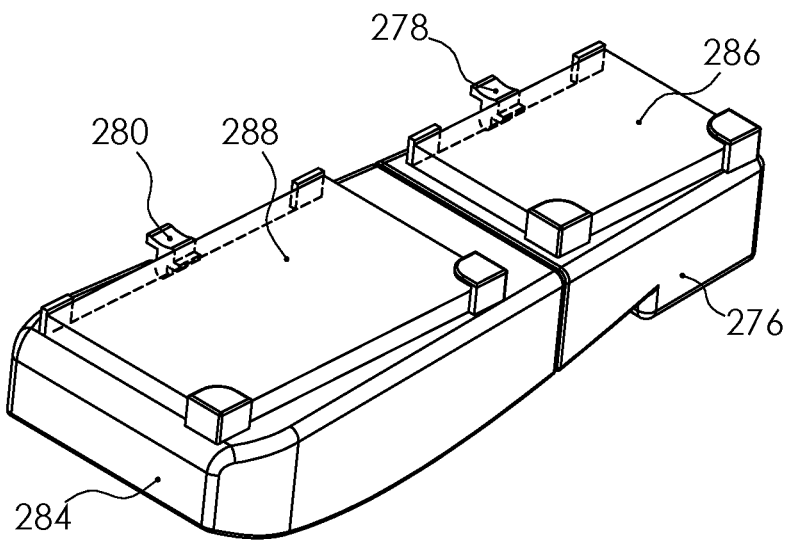

FIGS. 22A-C similarly, in a non-limiting example, shows another mechanical option to connect accessories underneath the present invention which has a design feature to help mechanically press fit the monitors or accessories to the body frames. The top figure (FIG. 22A) shows how the main frame 284 with a plurality of extruded standoffs 272, 274 and 282, and fit lock connectors 280 and 278 secure the monitors or accessories to the frames of the modular frames of the present invention. In FIG. 22B (in the middle), a method to secure or store the monitor or accessory 292 to the main frame is to add a press-to-fit type or similar protective plug/lock 290 that is attached to the main frame 284 whose connector mates to the monitor's data, power and/or video port receptacle 291. The protective plug/lock 290 is sitting on a ball socket mates onto the monitor's port connector 280 to keep the monitor in place with cooperation of the extruded standoffs, 272 and 282. The bottom FIG. 22C illustrates how the fit lock connectors 280 and 278 block the entrance of dirt and at the same time provide mechanical supports to the monitors or accessories 288 and 286 to keep them attached to the main frame 284 and the hub section 276, respectively.

Figure 23A:
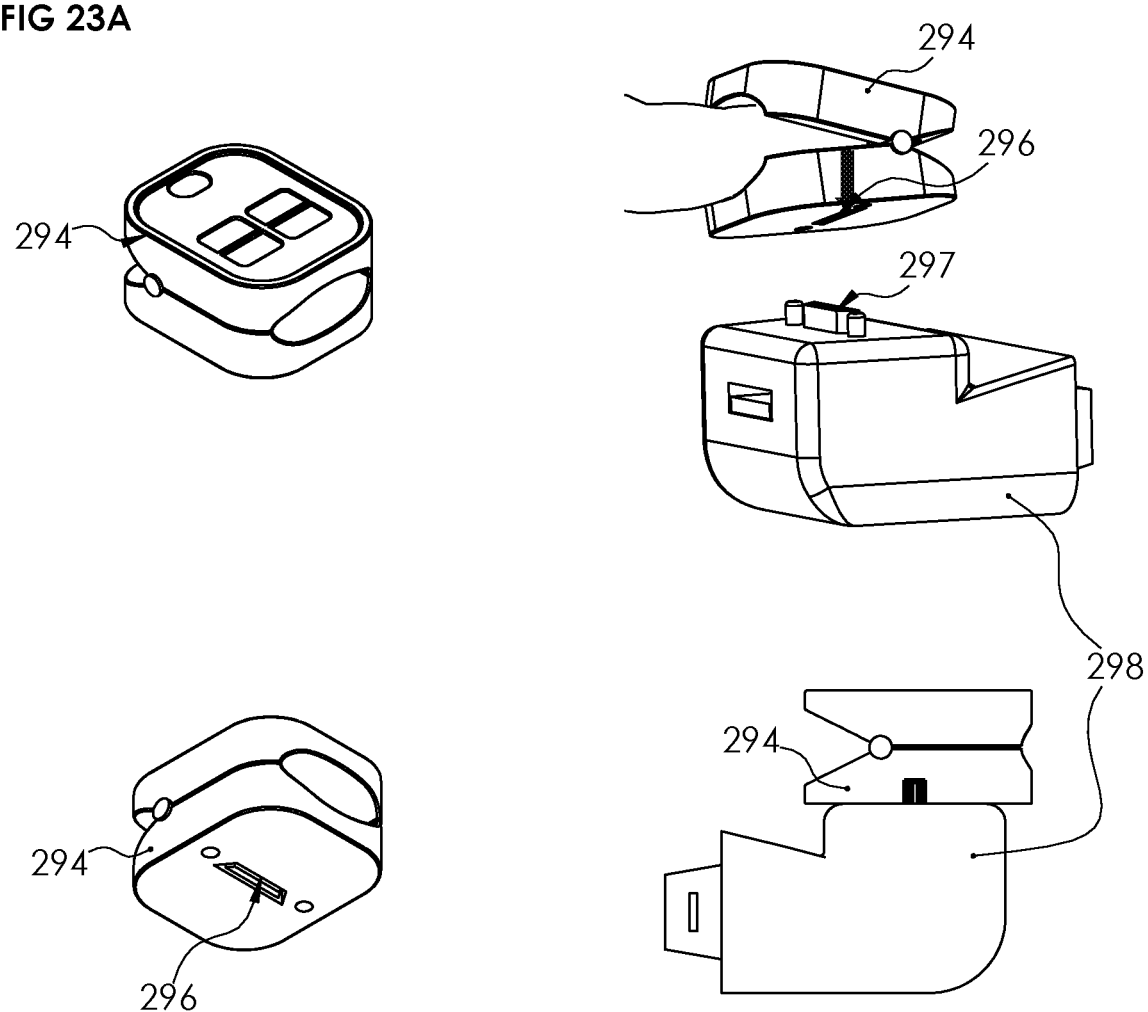
FIGS. 23A and 23B is an example of an accessory, such as a fingerprint reader, installed onto the hub section of the modular design embodiment of the present invention.
Figure 23B:
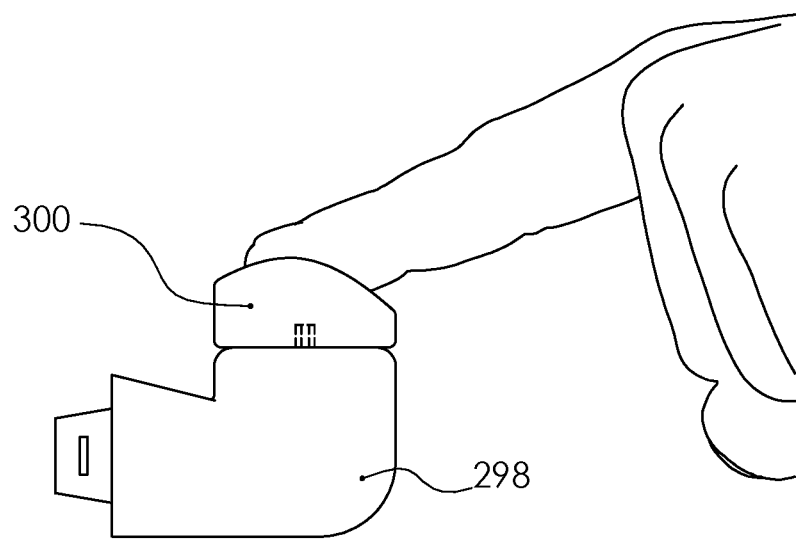

FIG. 23A shows different sensors or other apparatuses that can be connected to the hub section of the modular mouse of the present invention, and therefore to the cloud using the computer or a direct connection, wired or wireless with a PC, tablet, smartphone or other IoT devices. This invention offers a User Interface to connect different apparatuses for entertainment, extended monitors for enhance multitasking, business, healthcare applications, among others. This figure shows an example of an oxygen and pulse sensor 294 commonly used in the market, with a data port 296 located underneath the sensor. The data port 296 of the sensor is connected in the port 297 or the hub section 298 and is available to transfer and receive data to and from the computer and the cloud. This invention has many applications for the healthcare industry or other industries, such as fingerprint reader 300 (FIG. 23B) that can be used for instance in banks to detect and identify the I.D. of the user.

Figure 24:
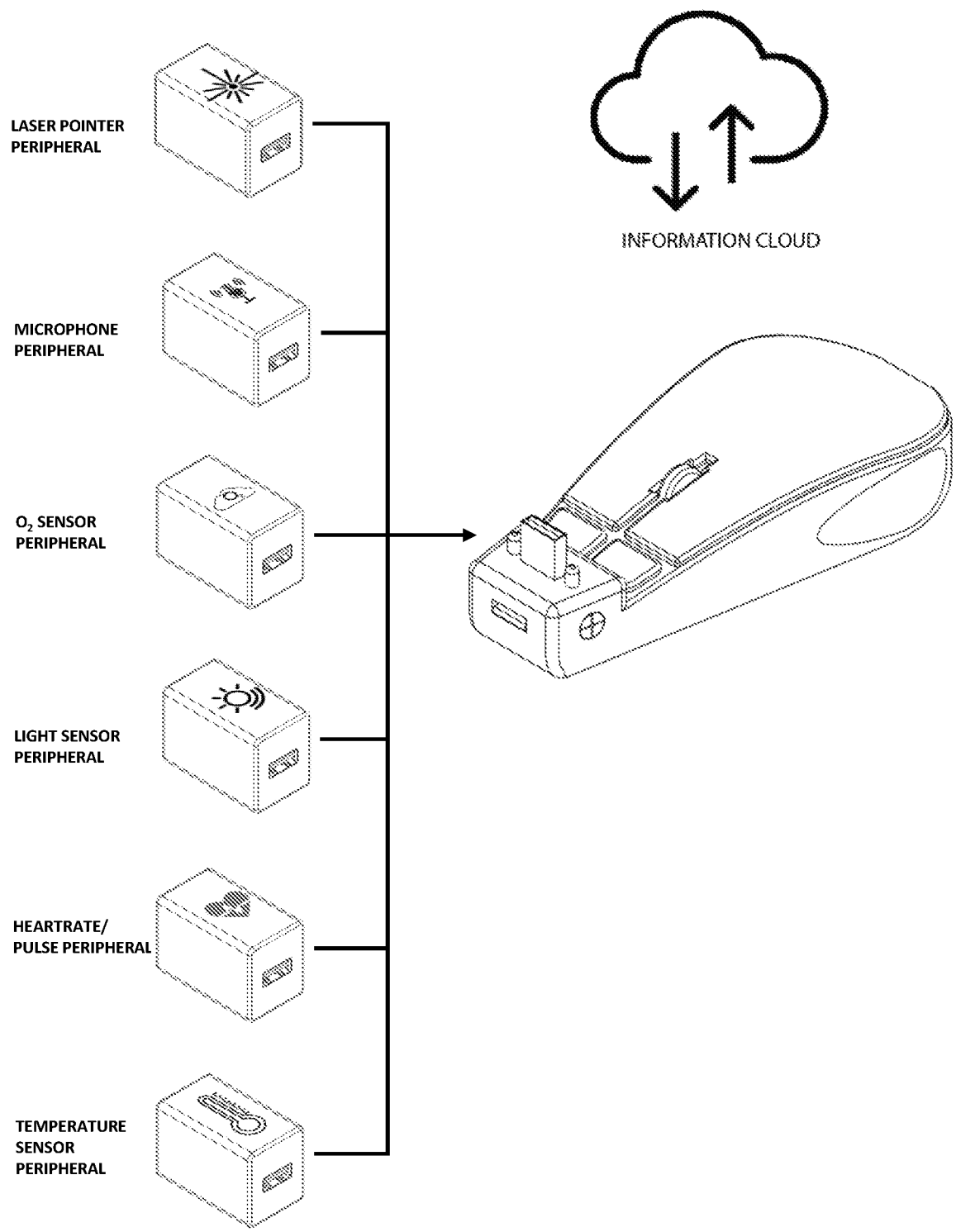
FIG. 24 is a schematic of the IoT capabilities of the unibody and the modular design embodiments of the present invention, and how it allows interfacing and exchange information from/to sensors, characters or touchscreen apparatuses with the computer and/or the cloud.

The present invention has Internet of Things (IoT) capabilities because it can be connected, wired or wireless with a computer or other IoT apparatuses. FIG. 24 illustrates different kinds of sensors (peripherals) that can be installed to the hub section of the present invention, allowing the transfer of data, power and/or video signals with other IoT apparatuses, software, databases, etc. The collected data detected by this invention, would be saved in an internal memory of the hub section, can be download and sent to a database in the cloud or computer where it's analysed and presented using Data Science algorithms programmed in an AI (artificial intelligence) machine. FIG. 24 illustrates the potential interconnectivity of peripherals and functionalities that is possible with the present invention. The peripherals include laser pointer, microphone, oxygen sensor, light sensor, heartrate/pulse peripheral, temperature sensor and many other devices or sensors available in the market.

The download and file storing feature of the present invention can be applied to download voices or sounds from the cloud, for instance, of a famous character that is installed on the hub section. The mouse of this invention includes an NFC (near field communication) reader module to detect the proximity of microchips installed in accessories, such as figurines of characters or other apparatuses, by using the RFID (radio frequency identification) technology.

A custom software developed to download, automatically or manually, movies trailers, marketing announcements, promotions, and other kind of information to be watched in the monitor, or to be emitted by the character, for instance is available for the mouse of the present invention.

The customer satisfaction surveys can be obtained at the Point-of-Sale by using the data-entry accessory connected to hub section of the mouse of the present invention, and the data is uploaded to the cloud and the software feature of this product can delivery analytics to the company or user.

The electronic design of this invention is now described. IoT (internet of things) is a technical name for any technology that captures data from any device or subject and transmit it, using an available network, to a database for analysis.

The mouse of this invention can capture video, images, health data, environmental data, security alerts or any other information in a home or office environment subject to be measured using an array of sensors. Then, the mouse transmits the data using the computer or other apparatus as a modem connected to the internet via a wired (LAN) connector or a Wireless (Wi-Fi, Bluetooth, 3G, 4G, 5G, etc) transport protocol. The data would reach a database where it is analysed using data science algorithms programmed in an AI machine.

The mouse of the present invention has a built-in memory feature. It is a wired and/or wireless features connectivity with computers or other apparatuses, and its versatility to share files in its built-in memory is an innovative design that facilitates business meetings, among other applications. As an example, a user of this invention does not have to carry a computer or share an external memory when making a presentation to others, because this invention provides an internal memory to back-up information and an extended monitor to do presentations with ease of access.

Figure 27:
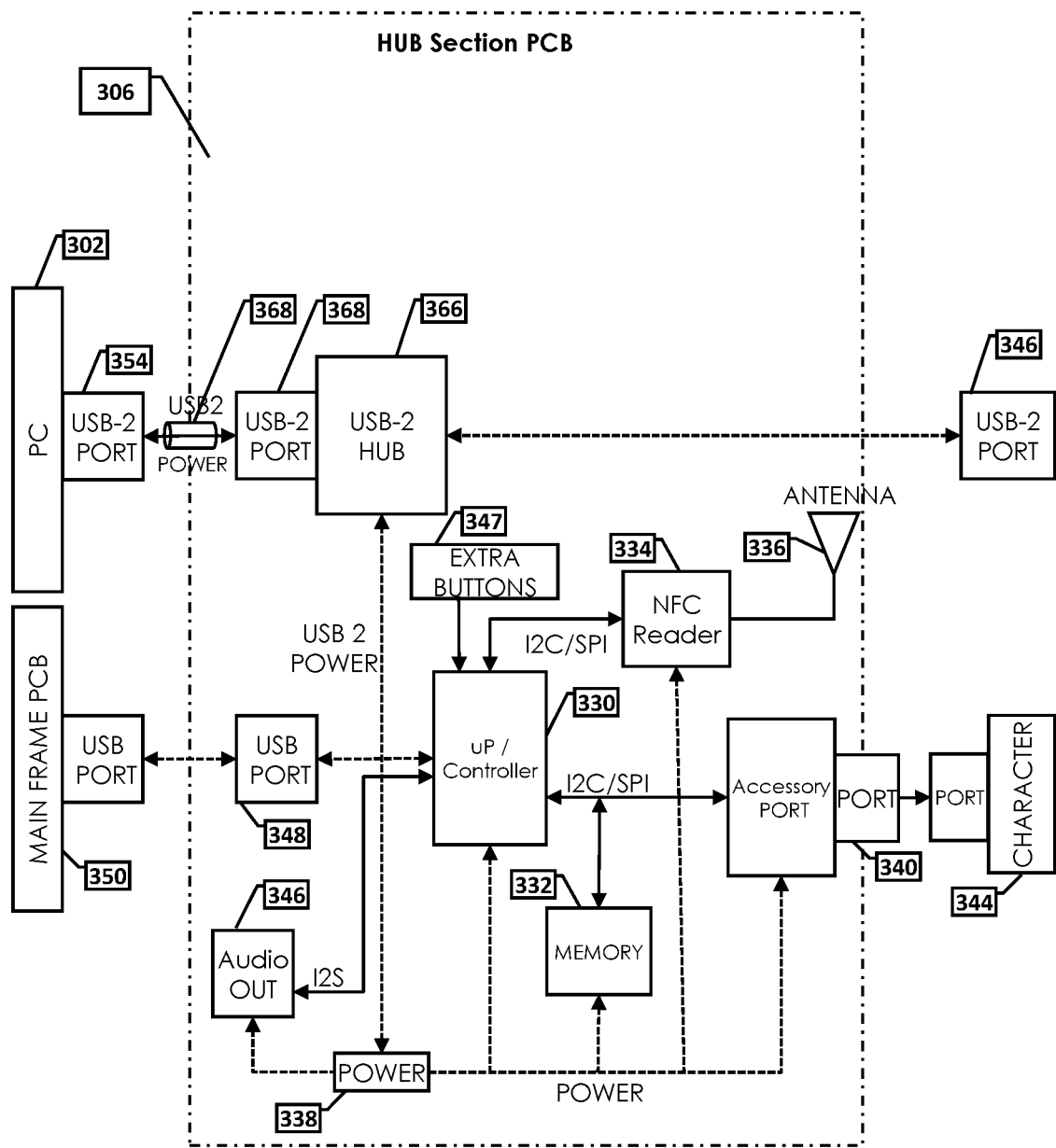
FIG. 27 is an embodiment of the electronic block diagram design of the hub section with an installed powered character and power supply from a PC and other peripherals.
Figure 28:
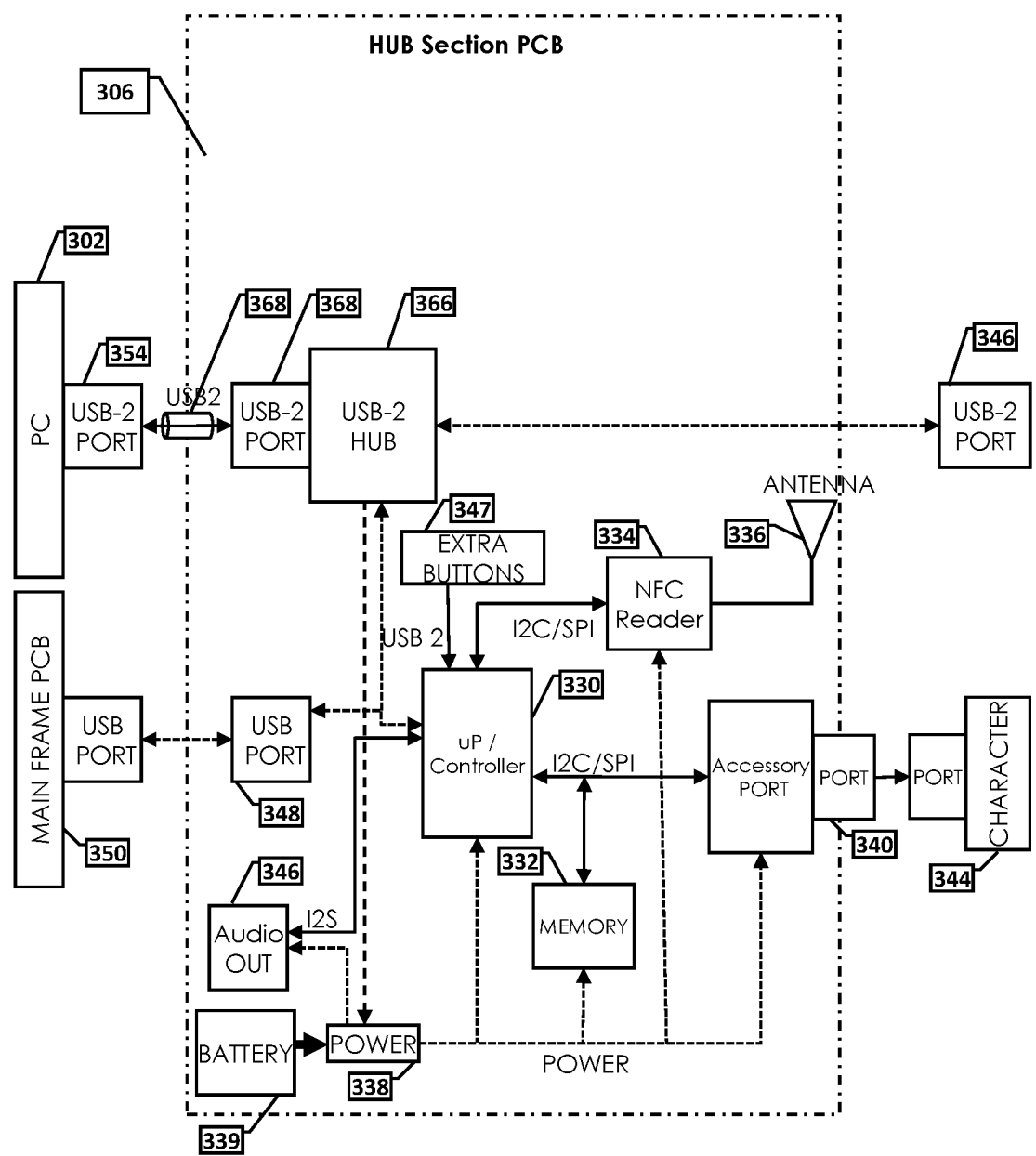
FIG. 28 is an embodiment of the electronic block diagram design for the hub section with an installed powered character and with power supply from an internal battery.
Figure 29:
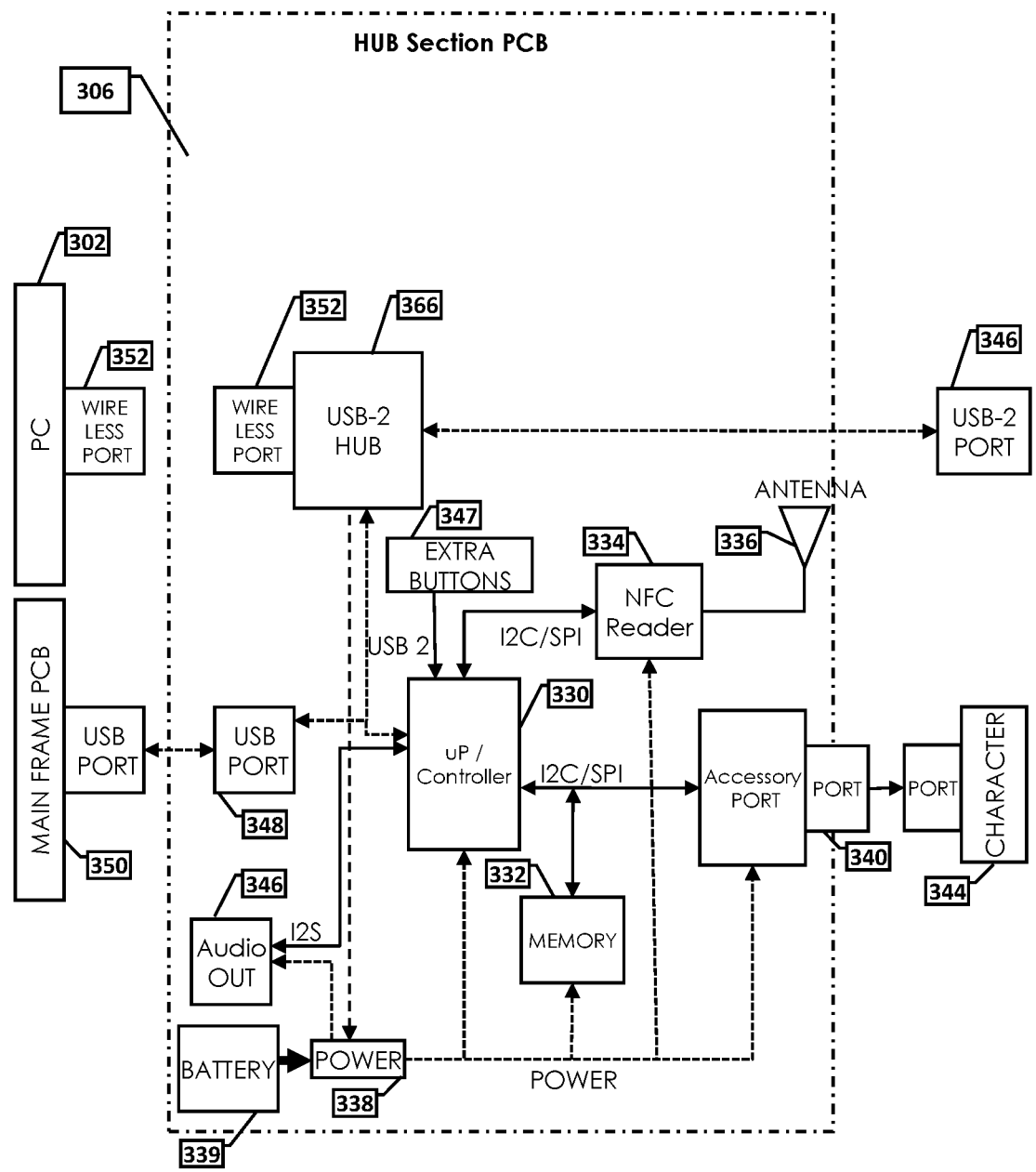
FIG. 29 is an embodiment of the electronic block diagram design of the hub section with wireless connectivity feature.

The description of the electronic design for the present invention is shown with reference to FIG. 25 through FIG. 29. As an introduction to explain how the electronic design of this invention works, the hub section is connected to a PC 302 using a USB-C port 304 (FIGS. 25 and 26) to connect a display monitor, or a USB-2.0 or 3.0 port 354 (FIGS. 27 and 28) or a wireless connection 352 (FIG. 29). This mouse compromises two printed circuit boards (PCBs). The first PCB is known as the hub section PCB 306 (FIG. 25 through FIG. 29) and the second is known as the main frame PCB 350 (FIG. 25 through FIG. 30). Both PCBs are connected through another USB port 348 which provides data, power and/or video signal transfer from the hub section PCB 306 to the main frame PCB 350.

The general electronic concept of the operation of this invention, is that the hub section receives, from a computer and/or other apparatuses, the input of power, data and/or video signals in the hub section input port 424 of FIG. 2C. In the same FIG. 2C, the hub section input port 424 is directly connected to the hub section PCB 425, which can manage and transfer the power, data and/or video signals to other ports of this invention, including but not limited to, the accessories input port 423, the main frame PCB 409 using the connecting port 408, and other peripherals installed into this invention, such as the speaker 418, internal memory 425, additional USB 2.0 or 3.0 ports, video-camera, microphone, etc. The main frame PCB 409 receive and exchange power with the batteries located in the compartment 403 and pointing component of the mouse feature such as the optical sensor.

Figure 25:
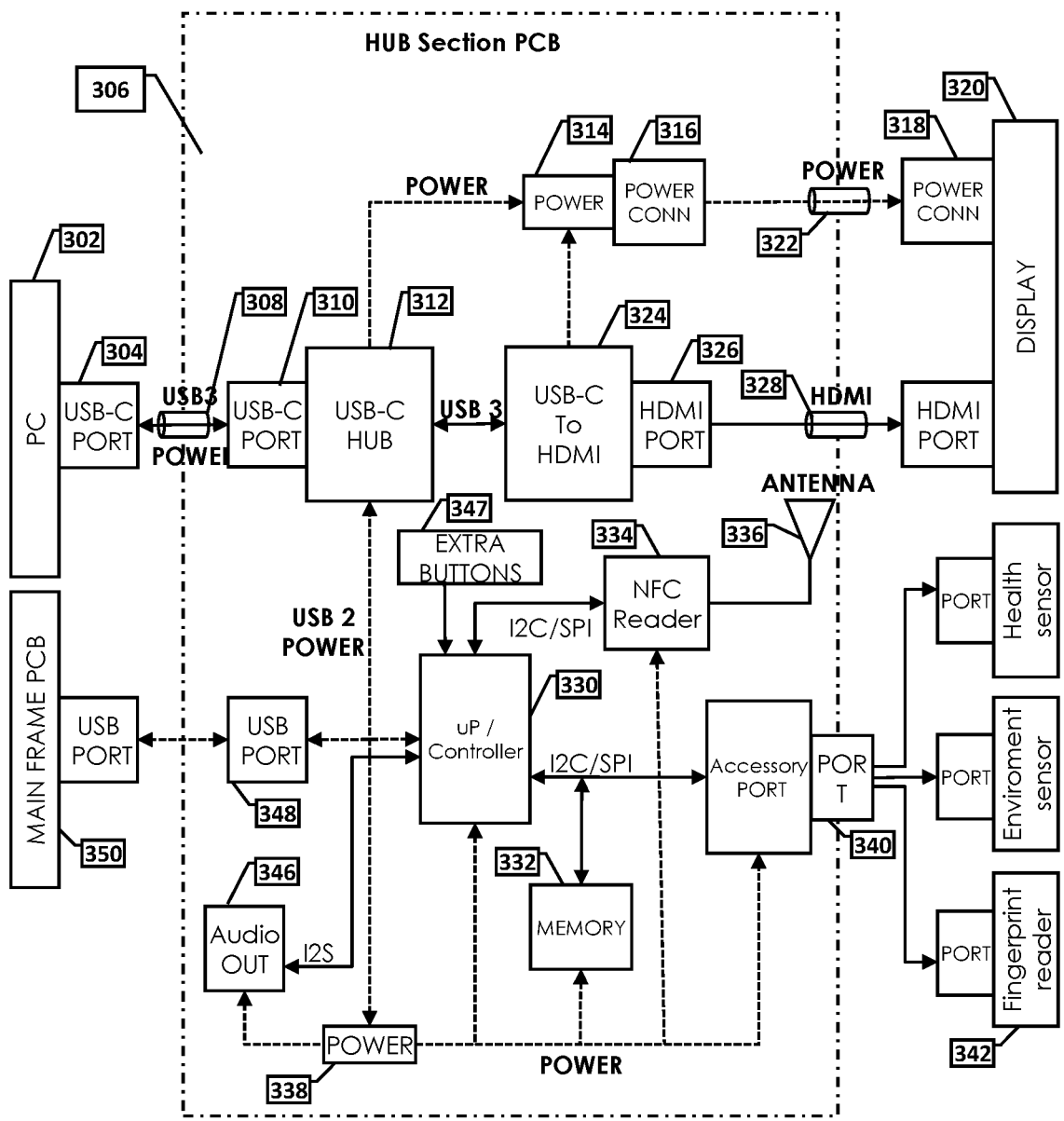
FIG. 25 is an embodiment of the electronic block diagram design of the hub section with an installed HDMI monitor and other peripherals.

The hub section provides multiple connections to different components. There are different electronic, power and IoT configurations for the mouse of this invention, depending on the applications, as follows:

FIG. 25. shows a block diagram of the electronic design of the hub section PCB 306 to receive the installation of a HDMI Monitor. A computer 302 or other similar apparatus, transfer the power, data and/or video signals through an USB-C or similar output port 304 to the input port 310 of this hub section of this invention using a type C cable 308. The USB-C hub 312 is connected to the power source 314, and through the power connector 316 the power signal is sent to another power connector 318 of the display 320 by means of power cables 322. The USB-C hub 312, using a USB-3.0 cable connects with an USB-C/HDMI converter 324, which send through its HDMI port 326, the video signal to the HDMI port of the Display 320 by means of an HDMI cable 328. The USB-C hub 312 is connected with a power controller 338 by means of a wired connection USB-2.0, and this controller distributes and controls the power to different apparatuses such as, the internal memory 332, the uP/Controller 330, the NFC (near field communication) Reader 334 and its antenna 336, the speakers 346, the USB port 347 that connects with the main frame PCB 350, the accessory port 340 that receives the installation of external apparatuses 342. The extra buttons 347 are, but not limited to, the alternate buttons 74 and volume control 82 of the FIG. 6A. The internal electronic and electrical connections would be I2C/SPI, I2C, USB-2.0, USB-3.0 and printed circuit among other possibilities known in the manufacturing market.

Figure 26:
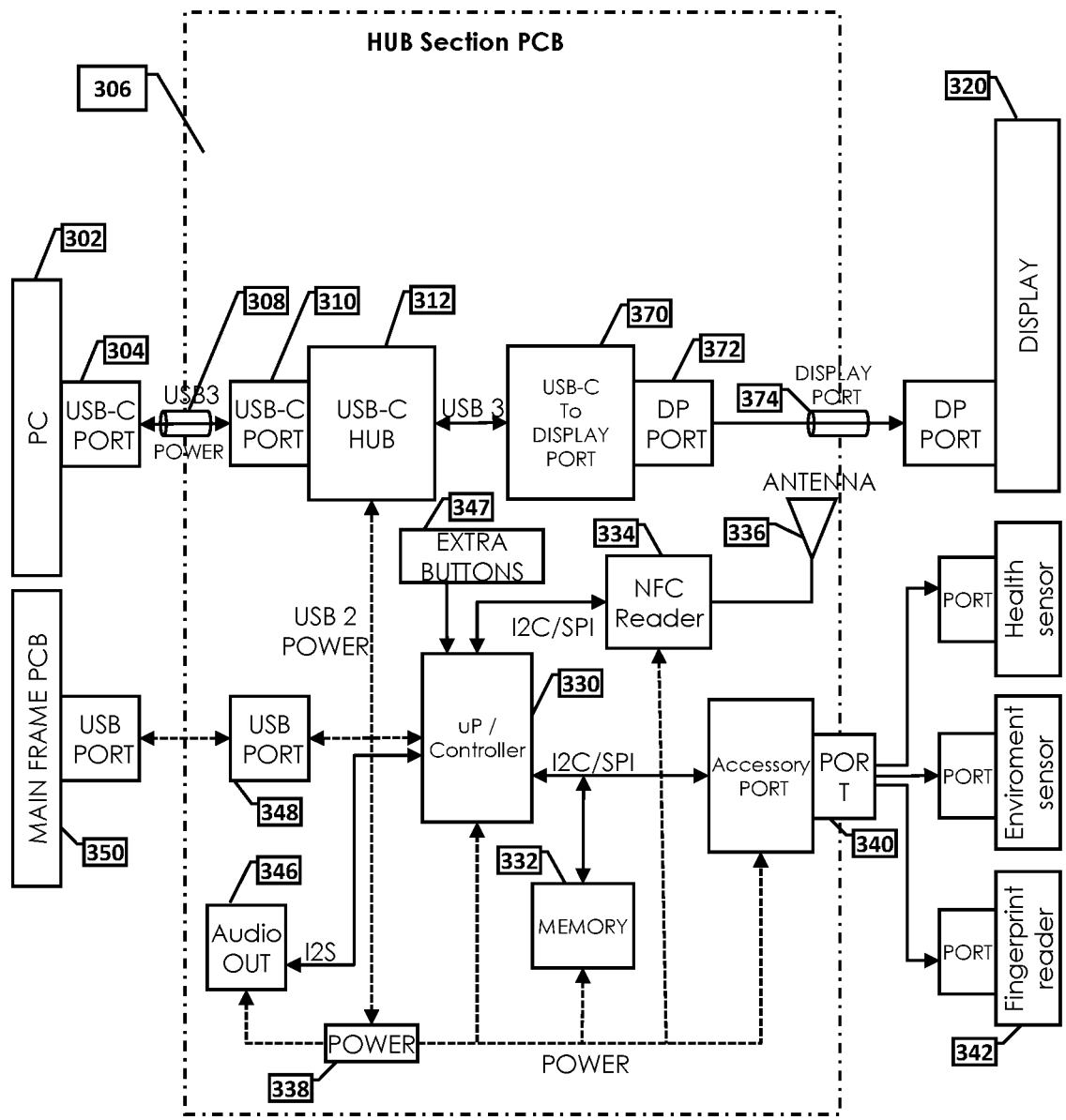
FIG. 26 is an embodiment of the electronic block diagram design of the hub section with a display port monitor configuration and other peripherals.

FIG. 26 shows a block diagram of the electronic design of the hub section PCB 306 to receive the installation of a Display Port Monitor. This diagram is the same configuration of FIG. 25, with the exception that this model uses a USB-C/Display Port converter 370 (instead of an HDMI converter), to send the video and power signals from the converter port 372 to the display monitor 320 by means of a display port cable 374.

FIG. 27 shows a block diagram of the electronic design of the hub section PCB 306 to receive the installation of a powered accessory. The computer 302 or other external apparatus provides the power and data signals to the hub section port 368 through a USB-2.0 or 3.0 cable. The USB-2.0 port 366 provides the power to one or more USB-2.0 ports 346 that can be built on the side walls of the hub section to connect other apparatuses to this invention at that location, for instance to charge a smartphone, and also send the power signal to a power controller 338 which distribute it to other internal and external peripherals related in FIG. 26, including the figurine (character) 344.

FIG. 28 shows the same configuration of FIG. 27 but with the option of having a built-in rechargeable battery 339 into the hub section, for instance, to act as a power bank to charge other apparatuses on the go. The built-in battery 339 is shown in the diagram at the left side of the power controller 338, and it would be recharged when the hub section wired connected by a cable 368 to a computer 302 or other similar power supply font such as an A/C adapter.

FIG. 29 shows the same configuration of FIG. 28 but with a wireless connectivity option. The hub section PCB includes a wireless port 352 to exchange data and/or video signals with other apparatuses. This invention includes a rechargeable or non-rechargeable set of batteries to provide power to the PCBs and accessories.

Figure 30:
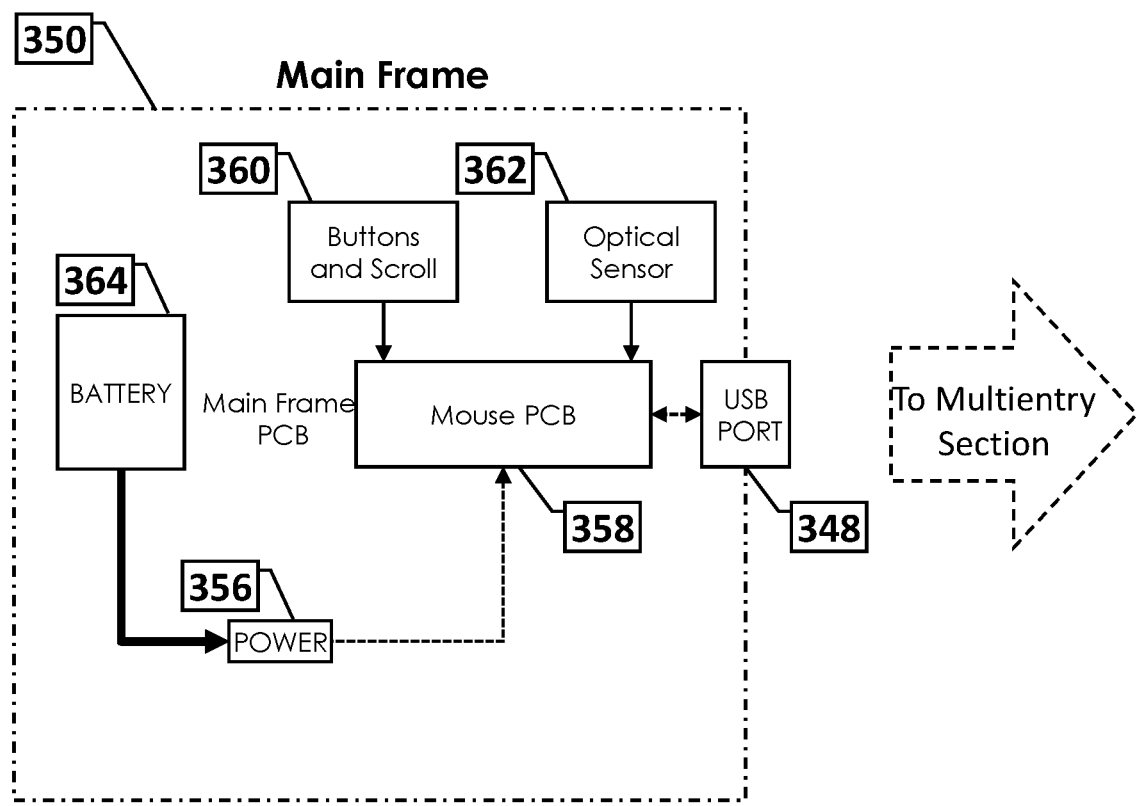
FIG. 30 is an embodiment of the electronic block diagram design of the main frame including the functions of a computer mouse.

FIG. 30. is a block diagram of the electronic design of the main frame PCB. The main frame PCB 350 connects to the hub section PCB using a USB-2.0 or USB-3.0 connecting port 348. This connector 348 is attached to the main frame PCB 358 and can provide data, video and/or power transfer if required. The main frame PCB 358 is connected to an optical sensor 362 and buttons and scroll keys 360. A battery or set of batteries 364, rechargeable or non-rechargeable, is attached to a voltage regulator 356. The voltage regulator has a power path connection with the main frame PCB 358.

Figure 31:
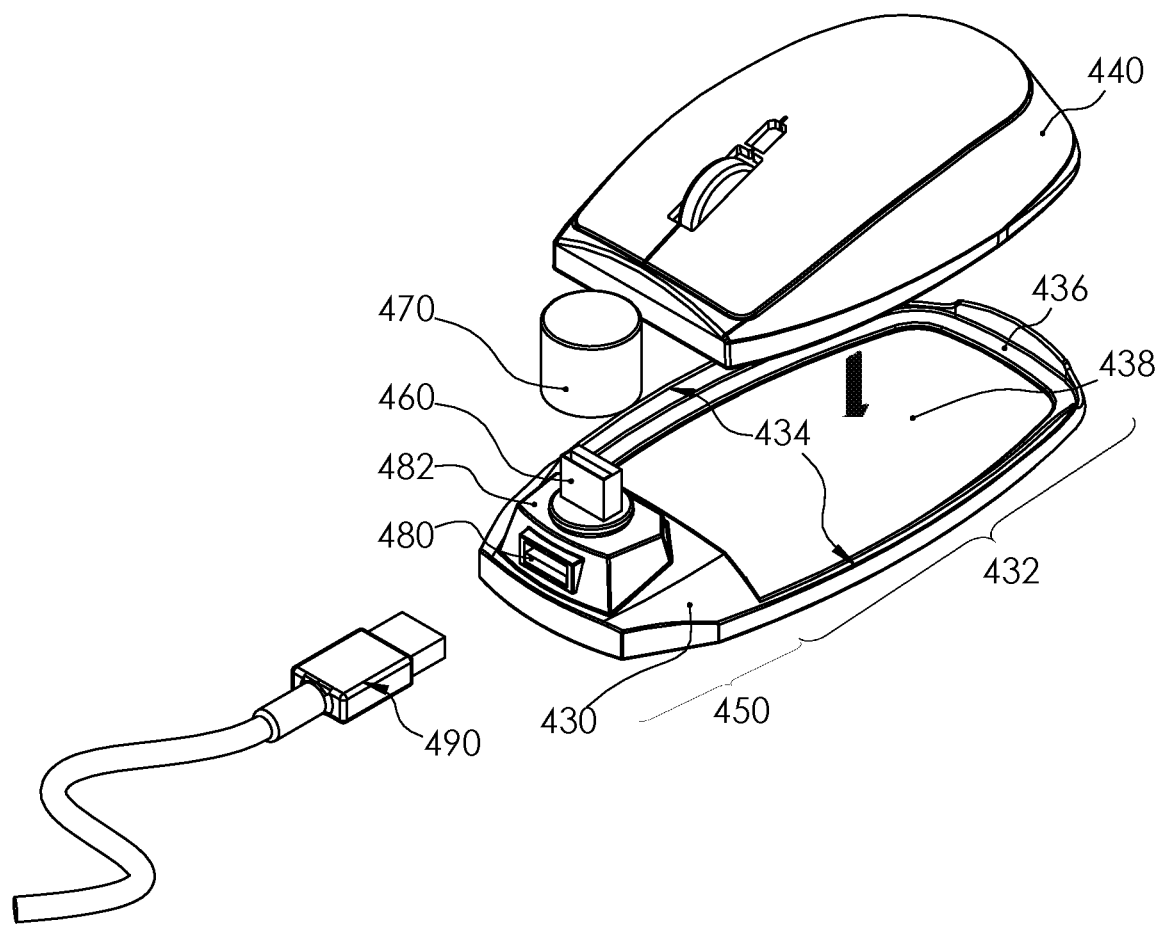
FIG. 31 illustrates the universal hub case design embodiment of the present invention in use with a standard computer mouse.

A universal hub case with IoT capabilities for a standard computer mouse is now described. FIG. 31 is a universal hub case apparatus 430 that can receive the installation of a standard mouse 440 and increase its IoT capabilities. A standard mouse 440 sits on the mouse seat section (base frame) 432 of the universal hub case 430, and a mouse catch section rim 434 rises up from the mouse seat section 436. The standard mouse operates normally from within the mouse seat section (base frame) since there is a hole or opening 438 in the bottom and the optical sensor will detect the movement of the mouse. This apparatus has the same features as the hub section of this invention, including a section 450 which has an accessory port 460 extending upward for the connection of the character, monitor, sensors or other devices 470 and a connecting port 480 on the front end 482 which is able to connect with a cable 490 and receive power, data and/or video signals from a computer or other apparatuses.

The usage options of this invention is described below. The present invention is a computer mouse that incorporates the flexibility to install and interchange different types of apparatuses combining with IoT capabilities, such as a monitor, microphone, sensors, characters and/or other devices or accessories. This new computer mouse interacts mechanically, visually or orally with the user or third parties and be used in different applications.

The internal and external structures are designed to house an additional and/or extended electronic boards and connectors of the latest technology that can manage, interface and/or detect the signals obtained from the external apparatuses and/or characters installed on the hub section of this invention, and receive and/or send signals to an external device, such as a computer, monitor, smartphones, tablets, gaming consoles, external memory, etc.

This invention would have, at least, the following applications: a.) Receive the installation of Decorative Applications: such as fixed or interchangeable figurines or characters, popular brands, customized advertisings, 3D images, etc.; b.) Receive the installation of Healthcare sensors and related Applications: Pulse, Oxygen, Temperature, Workstation Light sensors.; c.) Office and House Applications: by the installation of a Pointer, Microphone, Memory, Camera, Lantern, Fingerprint sensors; d.) Media Application: to install a monitor, tablet, smartphone, gaming consoles or a computer, among others.

The decorative applications for use with the present invention are described with reference to the figures. As shown in FIGS. 3, 4, 5A and 5B, and 13 through 16, different kinds of decorative accessories can be installed onto the hub section. The following are some non-limiting options: a.) fixed toy or character: In this case the figurine, toy or character cannot be separated from the hub section of the mouse. That is, the toy, figurine or doll is fixed to the hub section, although it could have the ability to rotate horizontally and vertically in different angles; b.) interchangeable toy or character where the toy or character can be released from the hub section, and replaced by a different one, or by a different application, as seen in FIGS. 16A and 16B; c.) luminous or rotative toy: this includes a power connector that allows a transfer of energy from the batteries for illumination or rotation actions; d.) popular phrases and marketing for popular phrases, maps of regions, etc. ("I love you!", "may I help you?", etc.); e.) Customized Name: user can customize the name of by selecting the word pieces and install it on the hub section (John, Susan, etc.). f.) Businesses and Corporations users can advertise their names, logos, slogans, special or seasonal events, etc. g.) 3D Printing Entry: of people or other figures provided by user (in glass or other light material; like a 3D figure of your family, your pet, etc.).

The healthcare applications of the present invention are now described. As shown in FIG. 23 there is an example of a health sensor installation. In this case, a Pulse & Oxygen sensor uses the hub section connection and transfers the collected data. The following are some options of applications and sensors: a.) Pulse and/or Oxygen: a sensor installed on the hub section of the mouse of this invention can measure the oxygen and pulse per minute of a user. The data is sent to a software application (app) to store and/or create statics and/or early warnings. The mouse-software will indicate the pulsations per minute in a pop-up screen, which can be programmed by the user; b.) Temperature sensor: this model measures the temperature body, by mean of a touching sensor or laser; c.) Workstation Light Level sensor: it senses and measures the quantity of light user has where the mouse is located. When the user has higher or lower quantity of light that could affect the vision of user. The mouse software will pop-up an alert in the computer or device's user if levels are out of recommended measures. This application could help some people to save their eyes stress, headache, and/or other collateral pains. The mouse software include thresholds and alerts that will give user early warnings and/or information, depending on the application.

The office and house applications are now described. As shown in FIG. 23 and FIG. 24 is an example of a Fingerprint Reader peripheral installation. The following are some options of other peripherals that can be installed on the hub section: a.) Microphone Entry: The mouse-microphone incorporates a high-tech microphone in the front in such a way that allows the participants of a conference to be closer to the microphone, improving the clearness of the audio signal heard by the other people on the other side of the computer or cell phone connection. This facilitates that the computer or smartphone or tablet does not have to be moved, but only move this invention close to the person who is speaking. It is common in business meetings to have many attendees in big large tables, then it will be easier to say . . . "Talk to the Mouse" for the other people connected to listen the speaker person clearly and louder. The connection is wired or wireless via Bluetooth, with the microphone built-in into the frame of this invention; b.) Memory stick reader Entry: to increase the data entry to the computer; c.) Lantern or Pointer Light Entry: a high intensity light, with low power consumption, in case user needs it in an emergency or if user want to improve the sharpness of something to see or read. A Pointer entry incorporates a laser on the front (colors to be selected), to be used when making a presentation. It incorporates two keys to pass a page forward or backward; d.) Fingerprint Reader Entry: this invention incorporates a fingerprint reader to validate the identity of people. This application is especially useful in banks and other entities that desire to integrate two devices in a single apparatus; e.) Third-party Data-Entry: to obtain data from the user or third parties, such as the satisfaction experience survey at a point-of-sale or other applications. This is used for companies to save, register, analyse and make decisions based on this Data-Entry data. Data is transmitted to the cloud by means of a specific data management system that is embedded in this invention or a connecter computer or apparatus.

The media applications of the present invention are now described with reference to the drawings. For the Monitor Entry: in FIGS. 20A and 20B, this version incorporates a lightweight compact monitor (between 3.0 to 4.5 inches, with 3.97 inches of active area preferred) that serves as an extended screen of the computer or other apparatuses. It is of use for conferences, in which all people do not have access to see the computer's monitor either because they are not on the same side of the computer, or because the computer's owner does not want them to see the monitor of the computer for privacy reasons. Several of these inventions in combination working simultaneously and on-line to show the same image of who/what is on the other side of a video call/conference, for instance, and providing users to meet remotely in places different than the regular meeting rooms offices that are commonly used in office buildings. The mouse can also be used as a TV screen when the user connects this invention to a computer, a TV transmitter, or to a smartphone, gaming console, tablet or other similar apparatuses.

The mouse of the present invention may be produced in the following description, although those of skill in the art will recognize other suitable manners of production. The multiple pieces of the outer shell of the unibody frame option and a portion of its internal mechanical parts, are made of acrylonitrile butadiene styrene (ABS) plastic that has been injection moulded. Sections of the outer shell of the unibody frame may also have an additional material such as thermoplastic polyurethane (TPU) or silicone. The optical sensor, data and power transfer options (Micro HDMI, USB, etc.), display monitor, and drivers are sourced made by specialty suppliers. All buttons, switches, electrical microswitches (made of plastic and metal) are also commodity components that have been manufactured and/or sourced from other suppliers. Integrated circuits, chipsets and printed circuit boards (PCB) are also standard items, although different proposed functions of the mouse may have proprietary chipsets designed, printed and programmed to fit the requirements of each peripheral function that is to be added to the hub section.

The printed circuit boards (PCBs) on which the electrical and mechanical components are mounted is custom-made for the functional design of the mouse peripherals. It is a flat, resin-coated sheet. Electrical resistors, capacitors, oscillators, integrated circuits (ICs), and other components are made of various types of metal, plastic, and silicon, also sourced from manufacturers that produce in quantity.

This invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A computer mouse device comprising:
    a main frame section integrally connected with a hub section for a unibody computer mouse device with an internal power source;
    said main frame section housing a first set of electronics for internet communication and electronic communication with said hub section and a computer device;
    said hub section having a connection port on a surface of said hub section, said connection port capable of securing a functional object and electronically transferring power and data between said functional object and said hub section; said surface of said hub section is a surface located on a head section; said surface has at least one mechanical connection protruding from said surface for mechanical connection to said functional object;
    said hub section having an input port for power, video, audio, and data transfer communications to and from said hub section and said hub section having an internal memory in said hub section;
    said hub section having a second set of electronics for internet communication and electronic communication with said computer device and said main frame section; said second set of electronics includes a near field communication reader module to detect proximity of said functional object.

2. The computer mouse device according to claim 1, wherein said functional object includes a female style connector which receives said at least one mechanical connection and said connection port for said data and said power transfer.

3. The computer mouse device of claim 1, wherein said functional object is a figurine.

4. The computer mouse device of claim 1, wherein said functional object is a media device.

5. The computer mouse device of claim 1, further comprising transferring video between said functional object and said hub section.

6. The computer mouse device of claim 1, further comprising at least one section underneath said computer mouse device for storing an accessory.

7. A computer mouse device comprising:
    a main frame section having a first end with an opening for receiving a hub section with at least one connector and a first hub connection port to form a modular computer mouse device;
    said opening defined by an inner bottom surface, an inner top surface, and a pair of inner side walls; said opening having at least one main frame connector inside of and extending within said opening from said main frame, said at least one main frame connector to connect with said first hub connection port;
    at least one receiving slot on at least one of said inner bottom surface, said inner top surface, or said pair of inner side walls to receive said at least one connector from said hub section;
    said main frame section housing a first set of electronics for internet communication and electronic communication with said hub section and a computer device;
    said hub section having said first connection port mating with said at least one main frame connector;
    said hub section having a second connection port on a surface of said hub section, said second connection port capable of securing a functional object and electronically transferring power and data between said functional object and said hub section;

said hub section having an input port for power, video, audio, and data transfer communications to and from said hub section and said hub section having an internal memory in said hub section;

said hub section having a second set of electronics for internet communication and electronic communication with said computer device and said main frame section; said second set of electronics includes a near field communication reader module to detect proximity of said functional object.

8. The computer mouse device according to claim 7 wherein said surface of said hub section is a surface located on a head section; said surface has at least one mechanical connection protruding from said surface for mechanical connection to said functional object.

9. The computer mouse device according to claim 8 wherein said functional object includes a female style connector which receives said at least one mechanical connection and said connection port for said data and power transfer.

10. The computer mouse device of claim 7 wherein said functional object is a figurine.

11. The computer mouse device of claim 7 wherein said functional object is a media device.

12. The computer mouse device of claim 7, further comprising transferring video between said functional object and said hub section.

13. The computer mouse device of claim 7, further comprising at least one section underneath said computer mouse device for storing an accessory.

14. A hub for a computer mouse device comprising:

a hub section with at least one connector for connecting to a main frame section of a mouse device, and a first hub connection port;

said hub section having said first connection port capable of mating with a connector on a separate mouse device frame;

said hub section having a second connection port on a surface of said hub section, said second connection port capable of securing a functional object and electronically transferring power and data between said functional object and said hub section;

said hub section having an input port for power, video, audio, and data transfer communications to and from said hub section and said hub section having an internal memory in said hub section;

said hub section housing a set of electronics for internet communication and electronic communication with a computer device and said main frame section of said mouse device; said second set of electronics includes a near field communication reader module to detect proximity of said functional object.

15. The hub for a computer mouse device according to claim 14, wherein said surface of said hub section is a surface located on a head section of said hub; said surface has at least one mechanical connection protruding from said surface for mechanical connection to said functional object.

16. The hub for a computer mouse device according to claim 15, wherein said functional object includes a female style connector which receives said at least one mechanical connection and said connection port for said data and power transfer.

17. The hub for a computer mouse device according to claim 14, wherein said functional object is a figurine.

18. The hub for a computer mouse device according to claim 14, wherein said functional object is a media device.

19. The hub for a computer mouse device according to claim 14, further comprising transferring video between said functional object and said hub section.

\* \* \* \* \*